(12) United States Patent
Chen et al.

(10) Patent No.: US 6,191,513 B1
(45) Date of Patent: Feb. 20, 2001

(54) STATOR-CONTROLLED MAGNETIC BEARING

(75) Inventors: H. Ming Chen, Latham; James F. Walton, II, Ballston Lake; Dennis H. Locke, Schenectady, all of NY (US)

(73) Assignee: Mohawk Innovative Technology, Inc., Albany, NY (US)

( * ) Notice: Under 35 U.S.C. 154(b), the term of this patent shall be extended for 0 days.

(21) Appl. No.: 09/179,304

(22) Filed: Oct. 27, 1998

(Under 37 CFR 1.47)

Related U.S. Application Data

(60) Provisional application No. 60/063,337, filed on Oct. 27, 1997.

(51) Int. Cl.⁷ ...................................................... H02K 5/16
(52) U.S. Cl. .......................... 310/90; 310/90.5; 310/68 B; 310/51; 318/615; 318/606; 318/623; 364/565; 364/164
(58) Field of Search ..................... 310/90, 90.5, 68 B, 310/51; 318/615, 128, 623, 649, 606; 364/565, 164, 148, 158

(56) References Cited

U.S. PATENT DOCUMENTS

| 5,084,643 | 1/1992 | Chen . |
| 5,202,824 | 4/1993 | Chen . |
| 5,666,014 | 9/1997 | Chen . |
| 5,752,774 | 5/1998 | Heshmat et al. . |
| 5,760,510 | * 6/1998 | Nomura et al. ............... 310/90.5 |
| 5,821,656 | * 10/1998 | Colby et al. ............... 310/90.5 |
| 5,825,105 | * 10/1998 | Barber et al. ............... 310/12 |
| 5,834,867 | * 11/1998 | Kikuchi et al. ............... 310/51 |
| 5,844,339 | * 12/1998 | Schroeder et al. ............... 310/90.5 |
| 5,856,719 | * 1/1999 | De Armas ............... 310/103 |
| 5,880,546 | * 3/1999 | Marroux et al. ............... 310/90.5 |

OTHER PUBLICATIONS

C. Henrikson et al, "Magnetically Suspended Momentum Wheels for Spacecraft Stabilization," AIAA Paper No. 74–128, AIAA 12ᵗʰ Aerospace Sciences Meeting, Washintgon, D.C., 1974.
J. Kirk et al, "Performance of a Magnetically Suspended Flywheel Energy Storage System," Fourth International Symposium on Magnetic Bearings, Zurich, Sw, 1994, pp 547–552.
H. Chen et al, "Novel Magnetic Bearings for a Flywheel Energy Storage System," ISROMAC–6, Honolulu, 1996.
K. Oka et al, "Magnetic Suspension System with Permanent Magnet Motion Control," Fourth International Symposium on Magnetic Bearings, Zurich, Sw., 1994, pp 131–137.
J. Walowit et al, "Analytical and Experimental Investigation of Magnetic Support Systems. Part I: Analysis," *ASME J. of Lubrication Technology*, vol. 104, 1962, pp. 418–428.
K. Astrom et al, Chap. 13, "Perspectives on Adaptive Control," *Adaptive Control*, Addison–Wesley Pub. Co. of New York, 1989, pp. 478–498.
H. Chen, "Design and Analysis of a Sensorless Magnetic Damper," 95–GT–180, International Gas Turbine and Aeroengine Congress & Exposition, Houston, Tx, 1995.

* cited by examiner

*Primary Examiner*—Thomas M. Dougherty
*Assistant Examiner*—Thanh Lam
(74) *Attorney, Agent, or Firm*—James C. Simmons

(57) ABSTRACT

A magnetic bearing wherein a stator is magnetically interacted with a rotor and is movable in response to feed-back of rotor position to thereby use the magnetic interaction between the stator and rotor to effect movement of the rotor toward a predetermined rotor position for bearingly controlling the rotor position. The bearing may be a radial or thrust bearing.

20 Claims, 14 Drawing Sheets

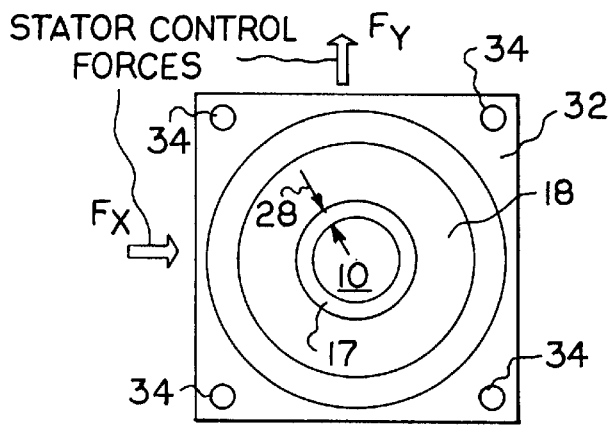
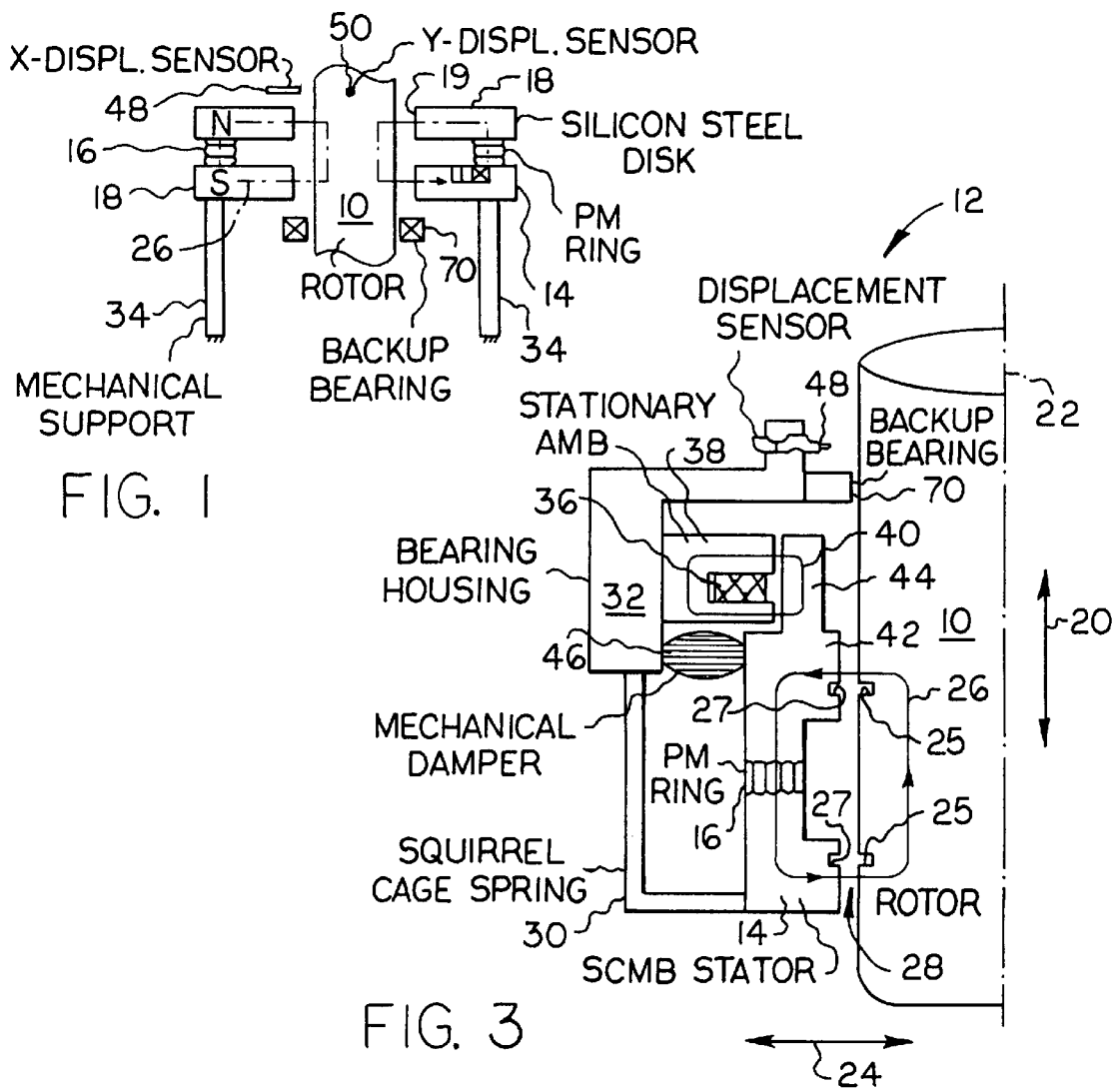

STATOR-CONTROLLED MAGNETIC BEARING

Priority of U.S. provisional patent application serial No. 60/063,337, filed Oct. 27, 1997, is hereby claimed. This provisional application is hereby incorporated herein by reference.

The present invention relates generally to magnetic bearings. Examples of magnetic bearings are disclosed in prior U.S. Pat. Nos. 5,084,643; 5,202,824; and 5,666,014 to Chen (one of the inventors), which are incorporated herein by reference.

To meet stability, control, and energy storage requirements for the next generation of satellites, combined momentum wheel and energy storage devices that are both efficient and compact are considered to be required. Since angular momentum is the product of wheel polar moment of inertia and rotational speed, a reduction in the wheel polar moment of inertia (i.e., the momentum wheel size and mass) must be countered by an increase in the speed if comparable reaction torques are to be provided for attitude control as well as energy storage. Since the momentum wheel mass is approximately proportional to the wheel diameter and the wheel polar moment of inertia is proportional to the diameter cubed, if the speed is increased by a factor of 10, the momentum wheel rim average diameter can be reduced by a factor of 2.15 (the cube root of 10), i.e., the wheel mass may be reduced by slightly more than half. Momentum wheel speeds using conventional ball bearings are limited to about 5,000 or 6,000 rpm for a life of about 10 years. Increasing the speed by a factor of 10 to about 50,000 to 60,000 rpm presents a challenge on bearing design. While improvements in bearing ceramic materials and lubricants should extend the potential operating speed range and life, extension of ball bearing capabilities to such high speeds is considered to be clearly beyond the capability of today's ball bearings, leaving magnetic bearings as the only currently viable alternative.

Active magnetic bearings have conventionally had stationary electromagnetic poles around the rotor. In rotation, the rotor surface material moves in and out of the magnetic flux of the protruding poles. The changing flux in the rotor surface material as it undergoes many fluctuations per revolution generates heat due to magnetic hysteresis and eddy currents. The eddy currents so generated not only cause power loss in the form of heat but also delay the control response of the electromagnets. To reduce the eddy current effect, the bearing cores have usually been made of silicon steel laminations. The eddy current heat generation when high speed rotors for satellites or other devices are operated in a vacuum can be a serious problem because it is difficult to dissipate the heat in a vacuum. This is because any heat generated on a rotor in a vacuum has to rely on thermal radiation for dissipation, which is ineffective until the rotor temperature reaches a level that may be detrimental to the momentum wheel material, or other thermal growth related problems may occur. Using permanent magnet biased homopolar active magnetic bearings which have extended pole edges in the circumferential direction can reduce the losses through reduced numbers of poles and the magnitude of the flux variations but do not completely solve the eddy current heating problem. The magnetic flux fluctuation frequency in high speed rotors is very high, resulting in high heat generation since these losses are proportional to frequency (speed) squared. This was especially evident in difficulties encountered with a magnetically suspended rotor system which was designed to operate to 75,000 rpm with homopolar bearings but was limited to approximately 20,000 rpm due to eddy current drag, as discussed in J. Kirk, "Performance of a Magnetically Suspended Flywheel Energy Storage System", Proc. 4th International Symposium on Magnetic Bearings, Zurich, Switzerland, 1994, pp 547–552.

In order to solve the above described problems of heat generated on a high-speed flywheel rotor, i.e., for momentum wheel and energy storage, operating in a vacuum, it has been suggested that continuous ring pole permanent magnetic bearings be used. Since the magnetic flux of ring shaped poles is not disrupted during rotation, the hysteresis and eddy current core losses can be kept to a minimum. Two radial permanent magnet ring type bearings have been suggested for a flywheel energy storage power quality application, as J. Walton and H. Chen (two of the joint inventors of the present invention) have discussed in "Novel Magnetic Bearings for a Flywheel Energy Storage System", presented at ISROMAC-6, Honolulu, Feb. 25–29, 1996. However, these bearings have stationary and rotating disks packed with many axially polarized permanent magnet rings; they are expensive to fabricate and have centrifugal stress concern at high speeds; they are not adequately stable; and their large axial negative stiffnesses require oversized active thrust magnetic bearings.

Another paper which may be of interest is "Magnetic Suspension System with Permanent Magnet Motion Control" by Oka, K. and Higuchi, T., Proc. 4th Int'l Symp. on Mag. Brg's, pp 317–320, 1994.

It is accordingly an object of the present invention to provide a stable magnetic bearing with minimum eddy current and hysteresis core losses and which is inexpensive to fabricate.

It is another object of the present invention to provide such a bearing which would allow gimbaling of a flywheel shaft for minute angular momentum corrections of a spacecraft such as a communications satellite.

It is a further object of the present invention to provide such a bearing which is compact axially for use for flywheels.

It is still another object of the present invention to provide such a bearing for use as a journal bearing but which also has axial bearing stiffness so that a separate thrust bearing is not required.

In order to provide such a stable magnetic bearing, in accordance with the present invention, the magnetic bearing is provided with a stator which magnetically interacts with the rotor and which is movable in response to feed-back of rotor position to utilize the magnetic interaction to effect movement of the rotor toward a predetermined rotor position. In order to provide a uniform magnetic field and thereby minimize eddy current and hysteresis core losses, the magnet is ring-shaped.

The above and other objects, features, and advantages of the present invention will be apparent in the following detailed description of the preferred embodiment of the present invention when read in conjunction with the accompanying drawings wherein the same reference numerals denote the same or similar parts throughout the several views.

BRIEF DESCRIPTION OF THE DRAWINGS

FIG. 1 is a schematic side elevation view illustrating a rotor and bearing in accordance with the principles of the present invention.

FIG. 2 is a top view thereof.

FIG. 3 is a schematic half-sectional side elevation view thereof and illustrating the bearing incorporated in a bearing assembly.

DETAILED DESCRIPTION OF THE PREFERRED EMBODIMENT

Figure 4:
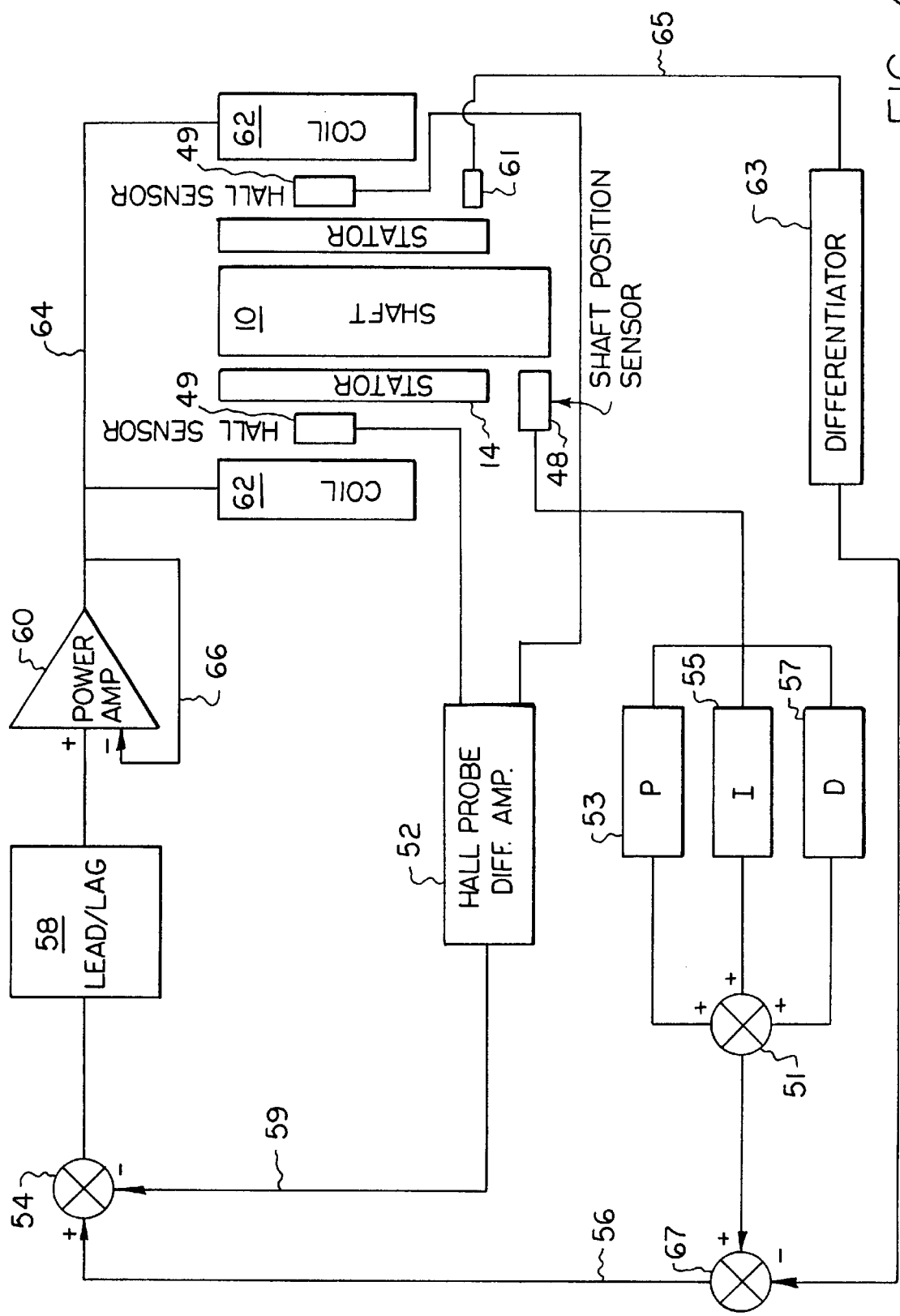
FIG. 4 is a schematic diagram of the control circuitry for the bearing.

Referring to FIGS. 1 to 3, there is illustrated at 10 a cylindrical rotor, which may, for example, be a vertical rotor such as used for energy or momentum storage flywheels for space applications, for which the present invention is considered very suitable. A magnetic bearing assembly for supporting the rotor 10 is illustrated generally at 12. The rotor 10 (at least a suitable portion thereof adjacent the bearing assembly 12) is made of magnetic material, i.e., ferromagnetic laminations of, for example, silicon steel such as conventionally provided in rotors supported by conventional active magnetic bearings.

The bearing assembly 12 comprises a stator 14 which, in order to provide a uniform circumferential magnetic flux field surrounding the rotor to eliminate the flux variations and the resulting eddy current drag previously discussed, includes a permanent magnetic ring 16 (i.e.,a member extending circumferentially entirely around the rotor) and two disks 18 of ferromagnetic material such as, for example, silicon steel on opposite sides axially thereof, whereby the ring 16 is sandwiched between the disks 18. As used herein, the term "axial" or variations thereof is defined as a direction, illustrated at 20, parallel to the rotational axis, illustrated at 22, of the rotor 10. As also used herein, the term "lateral" or variations thereof is defined as a direction, illustrated at 24, normal to the axis 22 of the rotor 10. Each disk 18 has a center hole, illustrated at 19, which serves as a magnetic pole. The rotor 10 is received within the holes 19, and an annular air gap, illustrated at 17, is accordingly provided between the rotating rotor 10 and each of the stationary disks 18. The magnetic ring 16 is axially polarized, i.e., it has a north pole on one side and a south pole on the other side, as illustrated in FIG. 1, providing lines of magnetic flux between the stator disks 18 and the rotor 10, as illustrated at 26 Thus, when the rotor is concentric with the stator (which should occur during steady state operating conditions, as discussed hereinafter), these lines of flux 26 around the rotor circumference will be uniform to eliminate flux variations and thereby eliminate the eddy current and hysteresis losses. Since the flux is generated by a permanent magnet ring, which consumes no electric energy, the bearing gap may be made large, with no energy penalty, to allow some level of gimbaling and thus integration with an attitude control system. The magnet ring 16 may alternatively be an electromagnet to allow greater power to be provided for gimbaling as well as for other reasons as described hereinafter with reference to FIG. 19. While the permanent magnet ring 16 may alternatively be mounted on the rotor, as shown at 104 in FIGS. 9 and 15, it may desirably be mounted on the stator, as shown in FIGS. 1 and 2, to alleviate concerns about high speed centrifugal stress.

The radial (in direction 24) magnetic flux field 26 in the air gaps 28 between the stator 14 and the rotor 10, if not otherwise suitably controlled as described hereinafter, would form an unstable magnetic bearing with a negative stiffness. In order to stabilize the bearing, in accordance with the present invention, the stator 14 is mounted via mechanical springs, such as, for example, squirrel cage springs, illustrated at 30, to a bearing housing 32 to be laterally movable and is motion-controlled laterally, as described hereinafter, by feeding back the rotor displacements in the x and y lateral directions. The stator 14 is suitably mounted on 4 rods, illustrated at 34, or other suitable means to prevent skewing thereof so that accurate lateral movement is achievable. Desirably, these rods 34 may be rigid supports such as hollow cylinders in order to be free of deleterious frequencies as much as possible and thus improve bearing performance.

Lateral movements of the stator 14 are effected by a suitable actuator 38 for the x direction suitably connected to the housing 32 for effecting such movement. A similar actuator (not shown) is positioned spaced circumferentially therefrom by 90 degrees for the y direction. The actuators 38 may, for example, be conventional active magnetic bearings. Thus, the actuator 38 includes a pair of permanent magnets 36 (one shown) on diametrically opposed sides of the rotor for providing bias flux and electromagnets (not shown) for providing control flux, and the adjacent portion 44 of the stator housing 42 is suitably composed of ferromagnetic material to effect a magnetic flux field, illustrated at 40, with the housing portion 44 for effecting stator movement in the x direction. Similarly, the y direction actuator effects a similar magnetic flux field with the housing 42 for effecting stator movement in the y direction. The magnetic bearing actuator 38 is segregated, i.e., axially spaced from the stator housing portion which houses the ring 16 and disks 18 so as to prevent undesirable magnetic interference there between. Additionally, if needed or desired, additional segregation may be provided by interposing there between an insulating member similarly as shown at 214 and described hereinafter with reference to FIG. 16. However, actuators 38 need not be magnetic bearings but may be other suitable means for laterally moving the stator 14. Therefore, they will not be described further herein. A suitable mechanical damper, illustrated at 46, of, for example, rubber or elastomer shear pads is provided between the stator housing 42 and the bearing housing 32 to dampen stator vibration.

For the x direction, a displacement sensor, illustrated at 48 in FIGS. 1, 3, and 4, is provided to measure the rotor off-center distance in the x direction. Similarly, a displacement sensor 50 is provided to obtain a measure of rotor off-center distance in the y direction. Since control in the y direction (which is independent of control in the x direction) is similar to control in the x direction, only control in the x direction will be described and illustrated herein. The information provided by the x-direction sensor 48 is used as feed-back through controller 51 to effect movement of the stator 14 in the x-direction (and movement of the stator is similarly effected in the y-direction using information provided by the y-direction sensor 50) to stabilize the rotor 10 at the desired centered position.

Referring to FIG. 4, the controller 51 is a PID (proportional, integral, and derivative control) controller which is conventionally known in the art and is described and illustrated in my prior aforesaid U.S. Pat. Nos. 5,202,824 and 5,084,643 which, as previously discussed, are incorporated herein by reference. One of the inputs to controller 51 is the time varying position signal P (proportional), illustrated at 53, for dynamic stiffness control. Control currents based solely on rotor position, while providing dynamic stiffness control, are considered to be inadequate alone to control the rotor at resonances or critical speeds. For reliable rotor control, it is considered that both rotor position and its rate of change need to be corrected. In other words, damping or velocity control, which is achieved by adding rotor velocity feedback to the current control, is also considered to be needed. In addition to dynamic stiffness and damping, basic rotor position error feedback is also considered to be required to statically center the rotor. The controller 51 is therefore provided to sum the proportional signal 53 for dynamic stiffness control, the integral, I, of the position signal error, illustrated at 55, for static stiffness control, and the derivative, D, of the time-varying position signal, illustrated at 57, for damping, in accordance with principles commonly known to those of ordinary skill in the art to which this invention pertains, and to output this summed information to controller 54 via line 56. Since a PID controller as well as its use is conventionally known in the art, it will not be described in further detail herein.

At any on-line control instance, the rotor displacements are thus measured and fed back through the control loop. However, an instantaneous force is required to be generated by the actuator and exerted on the stator, independent of the stator displacements. In order that the stator actuator be as linear as possible while having a wide bandwidth in order to maintain controller simplicity, in accordance with the present invention, the stator actuator is provided with its own control loop using Hall-effect flux probes or other suitable flux sensors as feedback sensors. Thus, for the actuator function, signals from x-direction Hall effect sensors 49 on diametrically opposite sides of the rotor are input to a difference amplifier, illustrated at 52, which outputs, along line 59, the difference in measured flux density indicative of how much force, if any, is applied to the stator 14 by the x-direction actuator 38. Similar y-direction sensors (not shown) are provided for the y-direction actuator, and, since the function is similar, it will not be described further herein. The command signal 56 from the PID controller 51 and the feedback signal 59 are compared in amplifier 54. The difference signal is phase-compensated, as illustrated at 58, and delivered to a power amplifier, illustrated at 60. The signal is suitably amplified in amplifier 60 and is sent via line 64 to the electromagnet 62 for the actuator 38 for effecting movement of the stator 14 which in turn moves the rotor 10 in the x direction The circuit 64 may be completed via a suitable resister (not shown) to ground for current monitoring purposes. While current feedback may be provided to the power amplifier 60, it was found that the Hall-effect probes were very noisy due to the current feedback saturating the power supply and thus subjecting the coils to bang-bang voltage input, i.e., large positive-to-negative voltage inputs oscillating from the maximum positive to the maximum negative voltage limits of the power amplifier. Therefore, in order to circumvent this noise problem, in accordance with a preferred embodiment of the present invention, voltage feedback from the output of the amplifier 60 is provided via line 66 to the power amplifier 60.

From an input created by the PID controller to a instantaneous coil current (equivalently a force on the stator), the loop gain G may be of concern, and it may be calculated as follows:

$$Ldi/dt+iR=E=G(i_c-i)$$

where

L=coil inductance=0.002 Hemy

R=coil resistance=1.0 ohm

E=voltage across coil $i_c$=command from PID control i=coil current $$i=i_cG/[jL\omega+(R+G)]$$

For low frequency operation (small ω), equation can be approximated by $$i=i_cG/[(R+G)]$$

Assuming the Hall probe sensitivity was 1 volt per ampere, a value of G equal to 10 times of R appears adequate.

The damper 46 should have adequate damping capacity but not at the expense of too much stiffness (thus counteracting the function of the spring 30). If desired, damping may be achieved, as illustrated, by using both mechanical damping, using dampers 46 (FIG. 2), and electronic damping, using circuit 65 (FIG. 4), as described hereinafter. Alternatively, pure damping (without increase in stiffness) may be implemented electronically by eliminating dampers 46 and by utilizing solely the electronic damping. Electronic damping may be implemented by measuring stator vibration displacements in both x and y directions using extra displacement sensors 61 and the values differentiated by a suitable conventional differentiator 63 to obtain the vibration velocities. A differential amplifier 67 is provided for receiving the signals from the PID controller 51 and from the differentiator 63 via line 65 and outputting the difference signal to the amplifier 54 via line 56. This provides adjustable damping, and, since these signals may be implemented in the actuator circuitry, may be used to tune the bearing for better performance, using principles commonly known to those of ordinary skill in the art to which this invention pertains. It should be understood that, alternatively, the signals of the Hall-effect, sensors may be used to re-create the velocities.

In order to provide the bearing assembly 12 with axial bearing stiffness for positioning the rotor axially and thereby eliminate the need for a separate thrust bearing, in accordance with a preferred embodiment of the present invention, one or more pairs of facing small circumferential grooves, illustrated at 25 and 27 are machined on both the rotor circumference and the inner diameter of the corresponding stator disc respectively. The resulting change in reluctance axially at the grooves 25 and 27 causes the rotor portion containing groove 25 to attract and thereby tend to become axially aligned with the stator portion containing the corresponding stator groove 27. This reluctance centering type of passive bearing is discussed in J. Walowit et al, "Analytical and Experimental Investigation of Magnetic Support System, Part 1: Analysis", *ASME Journal of Lubrication technology*, vol. 104, 1962, pp 418–428. Therefore, it may not be necessary, especially in space where weight is not a factor and the thrust stiffness may therefore be less, to use an active thrust magnetic bearing or other separate thrust bearing with a radial or journal bearing, in accordance with the present invention, having such reluctance centering grooves 25 and 27. While the reluctance grooves 25 are shown in FIG. 1 to be formed in the rotor, it should be understood that, alternatively, the grooves 25 may be formed in a sleeve which is suitably attached to the rotor.

When not under control of the stator 14, the rotor 10 leans on or is rotationally held by a suitable back-up bearing, illustrated at 70. When not in operation, the stator 14 leans on a suitable stop or support, illustrated at 72 in FIG. 6, in the opposite direction.

Figure 5:
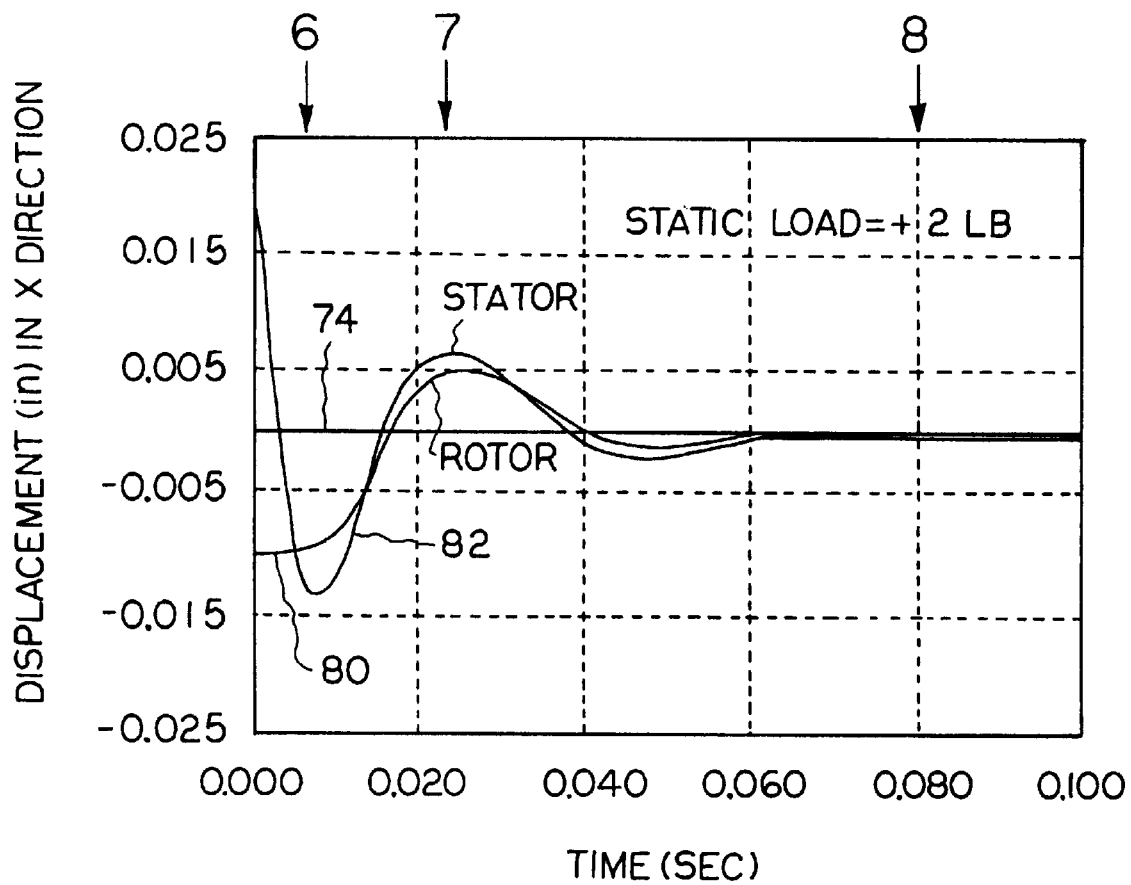
FIG. 5 is a graph illustrating displacement over time of the rotor and stator of the bearing during lift-off (start-up) until stable operation thereof.
Figure 6:
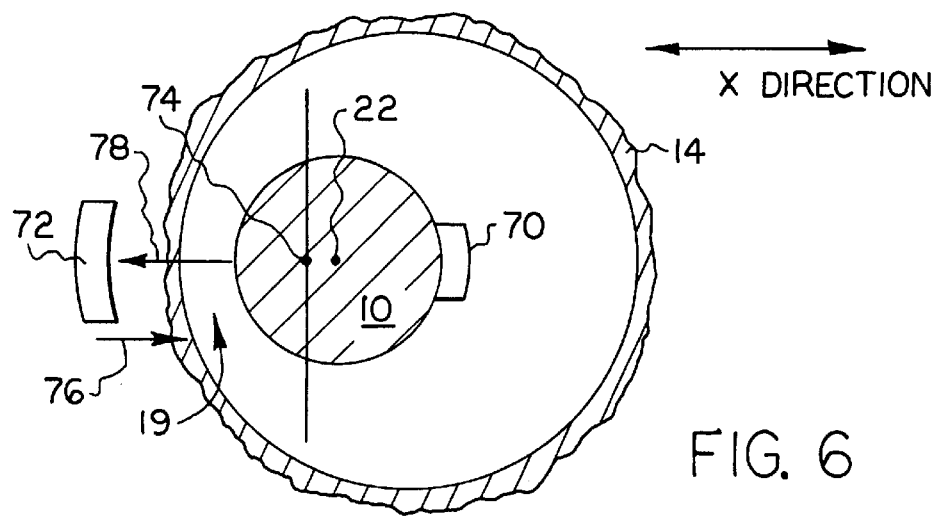
FIG. 6, 7, and 8 are diagrammatic illustrations of successive stages of stabilization of the bearing from lift-off to stable operation thereof as illustrated in FIG. 5.
Figure 7:
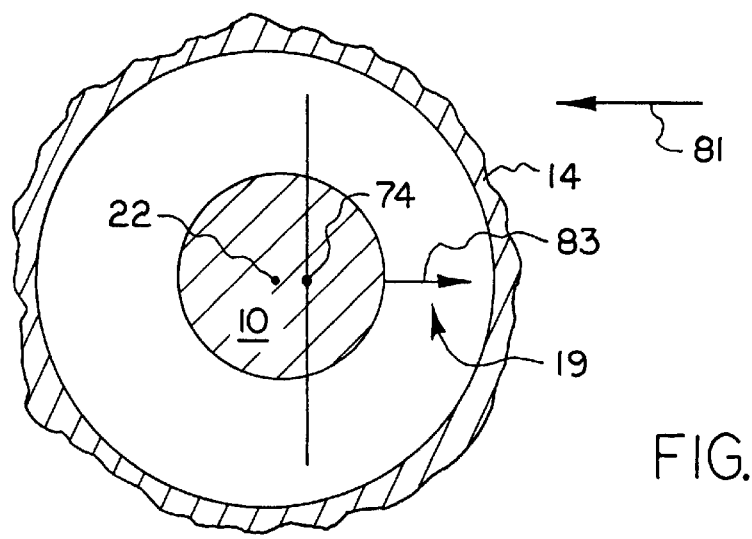
Figure 8:
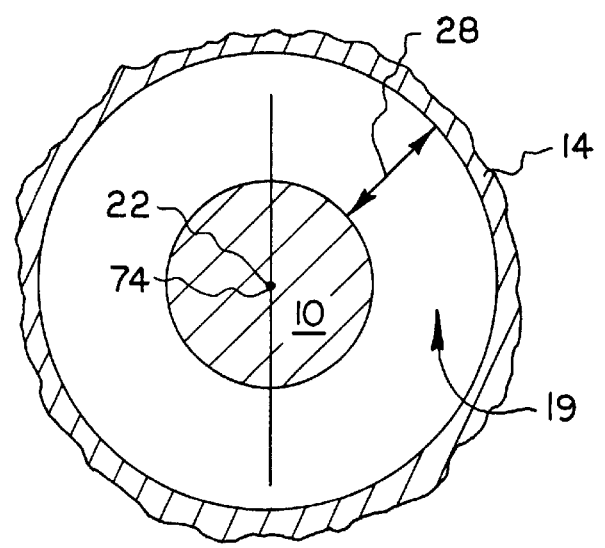

FIG. 5 illustrates at 80 and 82 respectively the displacements of the rotor rotational axis 22 and of the stator axis from center, illustrated at 74, in the x direction during lift-off or start-up until the rotor 10 has been stabilized with its axis 22 in the x direction at center 74. By "center" is meant the desired position of the rotational axis .22 of the rotor 10. It should be understood that there will be similar displacements in the y direction until the rotor is also stabilized with its axis 22 in the y direction also at center 74. FIGS. 6, 7, and 8 are exaggerated illustrations of the positions of the rotor 10 and stator 14 at times indicated at 6 (about 0.008 sec.), 7 (about 0.022 sec.), and 8 (about 0.08 sec.) respectively.

Initially before start-up and control by the stator, the rotor 10 leans on back-up bearing 70 (x=−0.01 inch) and the stator 14 leans on support 72 in the opposite x direction (x=+0.02 inch). Thus, the axis 22 of rotor is displaced about 0.01 inch from center 74 before start-up. When stator control is begun, the sensors 48 detect this displacement with the result that the stator 14 is signaled to move, as illustrated at 76 in FIG. 6, to the rotor side. This generates a net force, indicated at 78 in FIG. 6, which pulls the rotor 14 toward the bearing center 74 and is shown in FIG. 5 to pull it beyond the bearing center 74 so that it is displaced therefrom on the other side but this time only by about 0.005 inch. Meanwhile, as the rotor 10 has been approaching and then crossing the bearing center 74, the sensors 48 have been continuously detecting this change in displacement, and the stator 14 has been accordingly signaled to move in the direction 81. When the stator 14 has moved to the position shown in FIG. 7, a net force, illustrated at 83, of smaller magnitude due to the lesser displacement is generated to pull the rotor 10 back the other direction and again to the bearing center 74. FIG. 8 shows the rotor axis 22 desirably at bearing center 74 for steady-state stable operation. The sensors 48 will continue to monitor the rotor position so that if the rotor deviates from bearing center the stator will accordingly be signaled to move so that it is brought back. The stator 14 is shown in FIG. 5 to settle slightly off-center to counteract static side pull.

Figure 9:
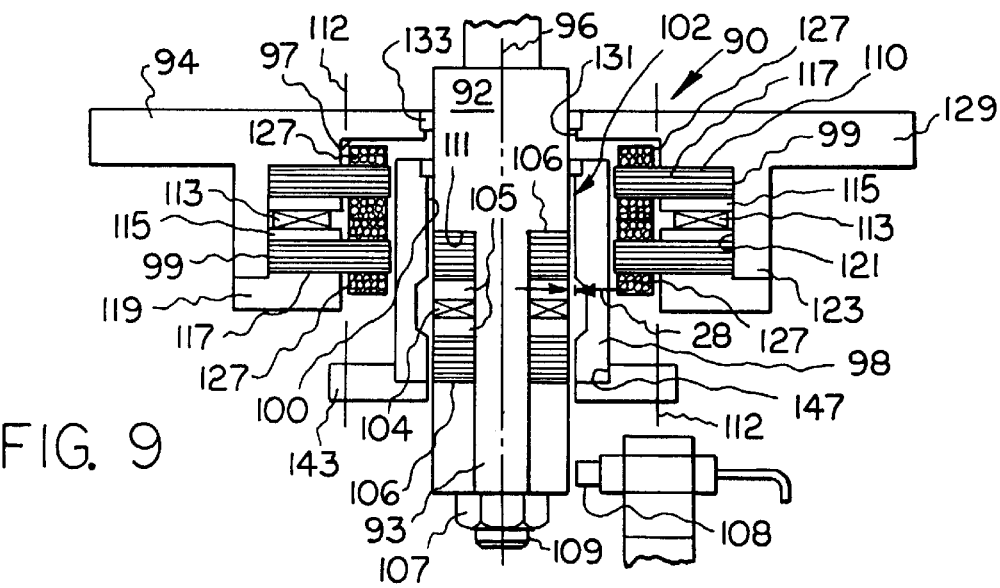
FIG. 9 is a schematic diagram of a magnetic bearing in accordance with an alternative embodiment of the present invention.
Figure 15:
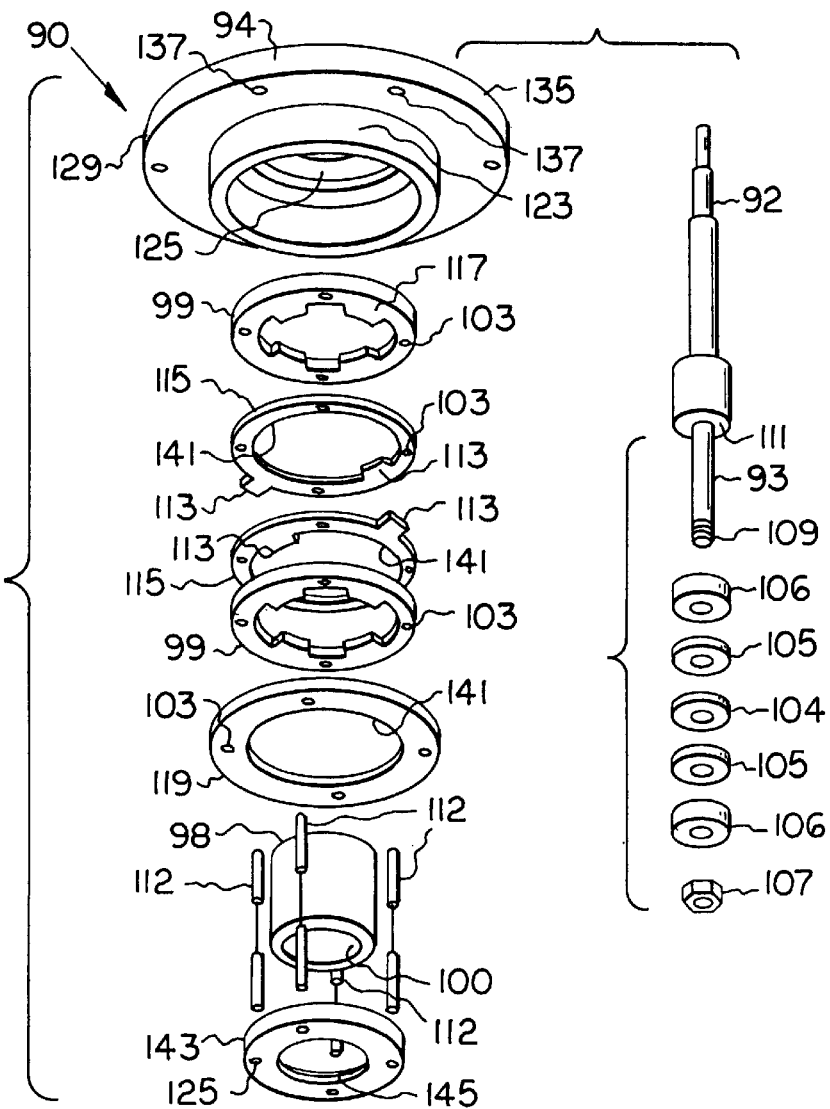
FIG. 15 an exploded perspective view of the bearing of FIG. 9.

Referring to FIGS. 9 and 15, there is illustrated generally at 90 a bearing assembly for rotor 92 in accordance with an alternative embodiment of the present invention. Mounted to a housing 94 for movement in x and y directions normal to rotor axis 96 is a stator 98 within a cylindrical bore, illustrated at 100, of which the rotor 92 is rotationally received, leaving an air gap 102. The actuator housing 94 comprises a cylindrical plate 129 having a central bore, illustrated at 131, for rotatably receiving the rotor 92. A back-up bearing, illustrated at 133, is contained within the bore 131. It is considered important that the stator be as light as possible since it is desired that the natural frequency of the stator be high for good frequency response. Increased mass undesirably reduces the frequency response of the control system and bearing. In order to keep the stator 98 as light as possible as well as allowing ease of manufacture, in accordance with a preferred embodiment of the present invention, an axially polarized permanent magnet ring 104, composed, for example, of NdFeB for producing the flux for controlling rotor position is received on the rotor 92. Thus, received on a reduced diameter portion 93 of the rotor 92 are the permanent magnet ring 104, a pair of spacers 105, composed of silicon iron or other suitable material, on opposite axial sides thereof, lamination stacks or disks 106 of ferromagnetic material axially next to the spacers 105 respectively to define north and south poles similarly as the magnetic ring 16 and disks 18 on the stator 14 of the embodiment of FIGS. 1 to 4. A nut 107 is threadedly received on a threaded end portion 109 of the rotor to hold the assembly of the ring 104, spacers 105, and discs 106 in place between the nut 107 and a shoulder 111 defining the other end of the reduced diameter portion 93. The stator 98 is (at least in the portion thereof adjacent the magnet ring 104 and disks 106) composed of a suitable ferromagnetic material so that a suitable magnetic flux field between the stator 98 and rotor 92 is obtainable. The stator 98 is actuated by a conventional homopolar electromagnetic bearing 110 or other suitable means for movement to stabilize the rotor position in response to signals received by probe or sensor 108 of displacement of the rotor in the x direction and by another sensor (not shown) of rotor displacement in the y direction.

The actuator assembly includes four permanent magnets 113, composed, for example, of NdFeB-35 (neodymium iron boron having a flux density of 3500 gauss to provide high strength and therefore high performance), spaced evenly circumferentially around the stator 98, a pair of spacers 115, composed, for example, of silicon iron, disposed on opposite axial sides respectively of the set of magnets 113 with the magnets suitably secured there between, and disks 99 of lamination stacks 117 of ferromagnetic material disposed axially next to the spacers 115 respectively to define north and south poles. These components are disposed and held within a counter-bore, illustrated at 121, defined by cylindrical housing portion 123 by suitable means such as ring-shaped clamp member 119 which is suitably attached to the housing 94 such as by screws (not shown) received in apertures, illustrated at 103, in the clamp member 119 and in the components 115 and 99 and threadedly received in threaded apertures (not shown) in the housing cylindrical portion 123. The individual lamination stacks 117 are wrapped by actuator coils, illustrated at 127 (not shown in FIG. 15). The axially inner coils 127 are partially disposed in a circular recess, illustrated at 97, of the plate 129. A flange 135 is defined to extend radially outwardly of the portion 123, the flange containing circumferentially spaced apertures, illustrated at 137, for receiving fasteners (not shown) for suitably anchoring the actuator assembly. All of the components 99, 115, and 119 have centrally disposed openings, illustrated at 141, for receiving the rotor.

A mounting plate 143 for the stator 98 has a central aperture, illustrated at 145, for receiving the rotor and a counter-bore, illustrated at 147, for receiving the radially outer end portion of the stator 98 via an interference fit. Four circumferentially spaced rods 112 (only their center lines illustrated in FIG. 9) or other suitable means are provided to support the mounting plate 143 and therefore the stator 98 as well as to act as a guided cantilever, i.e., to minimize rotation of the stator 98 (by minimizing rotation of the mount 143) as it is translated and thus to prevent inaccuracies in rotor position control which may otherwise occur as well as to allow a high natural frequency for the stator. The rods 112 are illustrated as being "necked" (having a smaller diameter) between their end portions to a size (diameter) selected to provide the desired stiffness. The flexible spring rods 112 are disposed within the component openings 141 and their end portions received in apertures, illustrated at 125, in the mount 143 and the housing 94 respectively and suitably fastened thereto such as by suitable fasteners. The bearing assembly 90 is otherwise similar to bearing assembly 12 in FIGS. 1 to 4, and the position of its rotor 92 may be similarly controlled for stabilizing thereof as previously discussed for the bearing assembly 12.

The required nominal air gap flux density for achieving Km of 500 lb/in may be estimated as follows(PM is permanent magnet):

$K_m = AB^2/2\mu_o g = 500(175)$ N/m ($\mu_o = 4\pi \times 10^{-7}$)

Air Gap=g=0.020/39.37=0.508×10$^{-3}$ m

PM Area=$A_m = (\pi/4)(D_i^2 - D_1^2) = 0.675$ in$^2$ =0.435×10$^{-3}$ m$^2$

Let $A = \pi(1")L = A_m \rightarrow L = 0.215"$

The required flux density B=$\sqrt{(2 \mu_o g K_m/A)}$=0.507 tesla=5070 gauss

PM thickness $L_m \approx 1.2(2g) \approx 0.050"$

It may be considered desirable to increase the gap width, illustrated at 28, to 30 mils in order to be able to measure the flux density using a thin Hall-effect probe. For gimbaling, the gap width 28 may be greater than 0.03 inch and up to about 0.10 inch. The gap width 28 is defined, for the purpose of this specification and the claims, as the radial distance (gap) between the rotor and stator in the area of a magnetic field there between when the stator is concentric with the rotor, as seen in FIGS. 2 and 8, wherein the distance across the gap is uniform all the way around the rotor.

Figure 19:
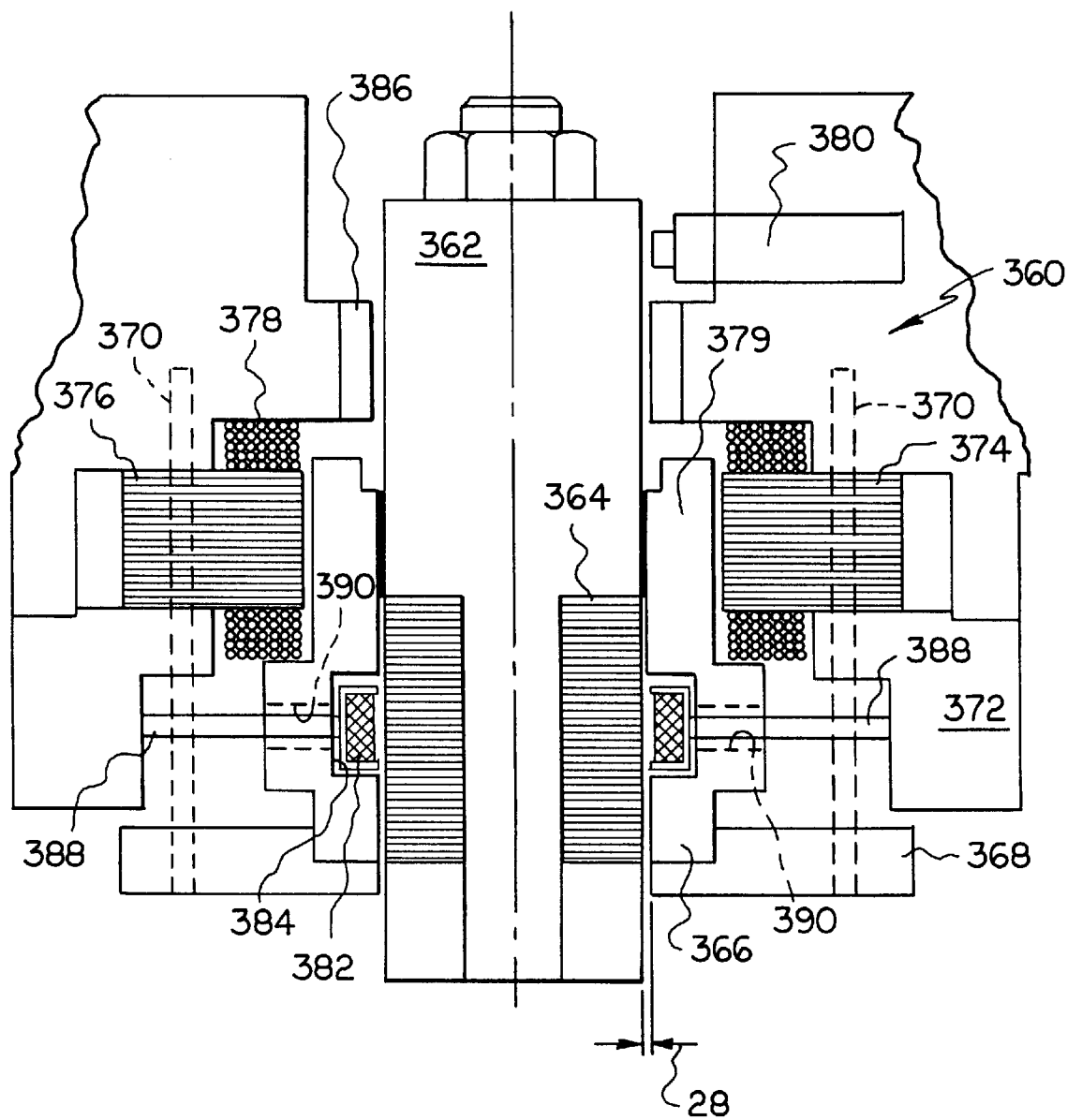
FIG. 19 is a view similar to that of FIG. 17 of another embodiment of the bearing.

Referring to FIG. 19, there is shown generally at 360 a magnetic bearing for a rotor 362 for a flywheel system. Shown at 364 is a portion of the rotor 362 containing laminations of ferromagnetic material. A stator is illustrated at 366. The stator 366 is suitably attached to a mount 368 which is held in the desired orientation by flexible stator mount springs 370, which may be similar to rods 34. Housing 372 supports a stator actuator 374 including electromagnetic means comprising laminations 376 of ferromagnetic material and coils 378 for magnetically interacting with ferromagnetic material 379 on the stator 366 for producing flux for moving the stator radially in response to feedback of rotor radial position via rotor position sensor 380 for the x direction and another such sensor for the y direction, similarly as described for FIGS. 1 and 2. A magnet ring 382 is provided in a notch, illustrated at 384, in the inner surface of stator 366 for facing and effecting magnetic interaction with the ferromagnetic material 364 for producing controllable and variable stator bias flux there between for effecting radial movement of the rotor, similarly as discussed with reference to FIGS. 1 and 2. A back-up powder lubricated journal bearing is illustrated at 386. In accordance with a preferred embodiment of the present invention, in order to minimize stator mass for better frequency response, the magnet ring 382 is supported separate from the stator 366 so that it is not supported by the stator. Thus, a plurality of support members 388 such as rods are received through radially extending bores, illustrated at 390, in the stator and fixedly attached to the actuator housing member 372, and the magnet ring 382 is attached to the rods 388.

A permanent magnet, while not consuming power, is limited to providing a fixed flux in the shaft-to-rotor gap. In order to provide a higher as well as variable flux in the gap, in accordance with a preferred embodiment of the present invention, the magnet ring 382 is an electromagnet. By providing a greater amount of flux, the gap width 28 may be increased with the amount of flux across the gap being sufficient to permit gimbaling (which applies reaction torques to an object and moves it) of a flywheel shaft for minute angular momentum corrections of a spacecraft such as a communications satellite. Thus, a magnetic controller for the rotor may receive command instructions from a satellite attitude control system to tilt the rotor to some desired orientation to effect a control moment on the satellite for re-orientation of the satellite. As previously discussed, for use of the bearing of the present invention for gimbaling purposes, the gap width 28 is preferably at least about 0.03 inch and may be as much as about 0.10 inch. The provision of an electromagnetic coil for bias flux provides increased controllability within the magnetic bearing system (instead of, for example, machining of the shaft to change the air gap when it is desired to alter the strength of the flux field. The provision of an electromagnetic coil also allows a revised start-up logic in the controller, i.e., the stator active magnetic actuator can first be activated and the stator levitated before the stator magnetic field is activated. Thus, advantageously, by being able to bring the stator electromagnetic flux up gradually, less initial peak current may be required for start-up. This may also permit larger initial gaps to be employed, which is particularly important if gimbaling action is to be employed with the bearing. It should be noted that the actuator and stator magnetic means are shown to be axially spaced thus providing some protection from the magnetic fields thereof interfering with each other. If needed or desired to prevent interference between the actuator and stator magnetic fields, an insulating member may be provided there between, similarly as discussed hereinafter with reference to FIG. 16. If desired, the magnetic ring 382 may be a permanent magnet, with associated ferromagnetic discs, similarly as discussed for FIGS. 1 and 2.

Figure 18:
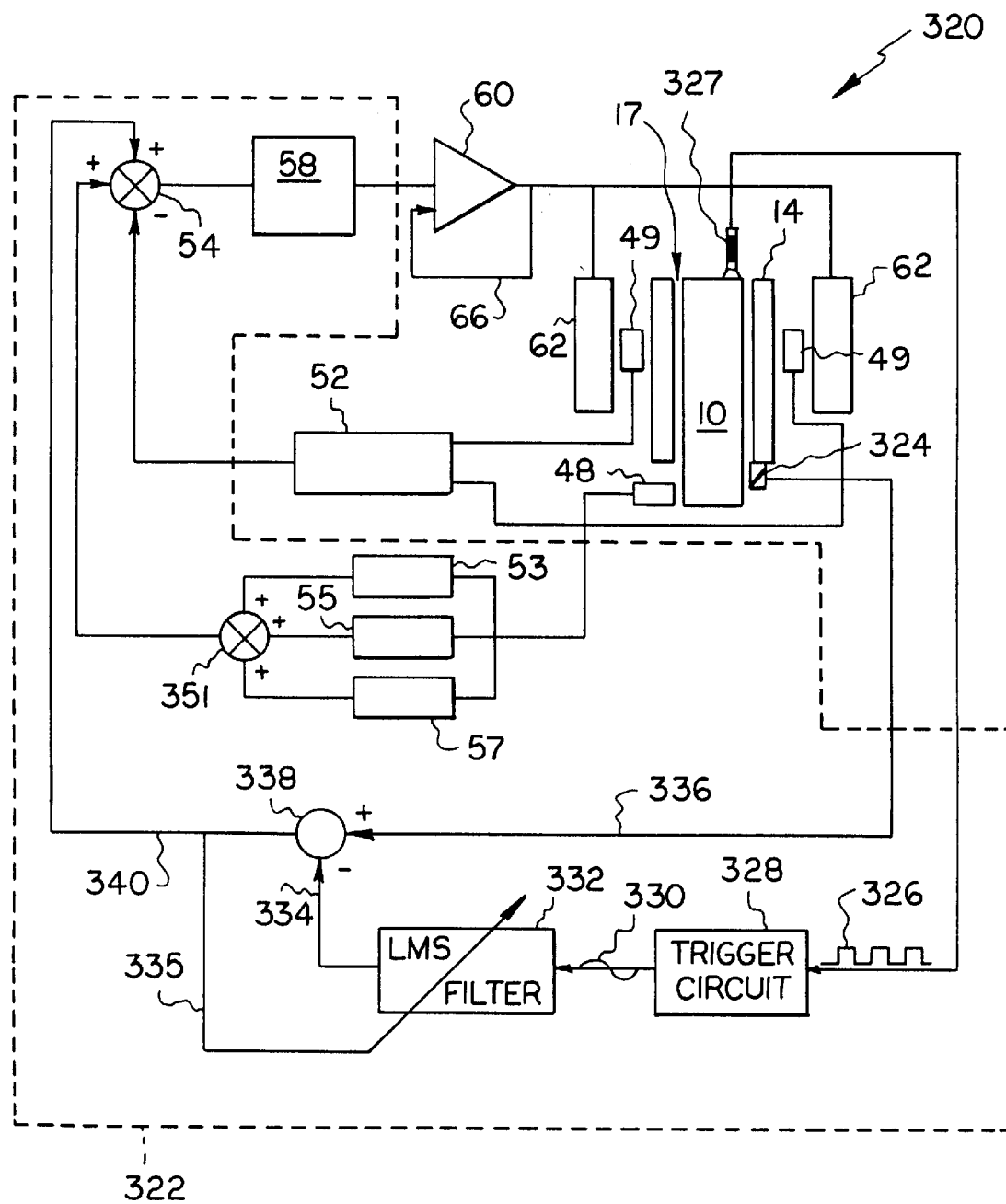
FIG. 18 is a schematic view illustrating an alternative embodiment of the control circuitry for the bearing.

A good rotor mechanical balance is considered desirable for a stator controlled magnetic bearing of the present invention. Referring to FIG. 18, in order to provide such balance as well as to provide a record of system parameters to lead to better understanding of the bearing and resultingly better control, the PID control circuitry is provided with a digital controller, illustrated at 351. Since the mechanical unbalance may be amplified by the "negative spring" effect of the flux between the stator 14 and the rotor 10, similar to the dynamic phenomenon of a rotor submerged in water, an on-line automatic balancing means, illustrated at 322, is desirably provided. This digital balancing means 322 includes a Hall-effect probe 324 on the stator 14 and aligned with either the x or y axis to measure the flux variation at the air gap 17. The flux variation should be directly proportional to the shaft force without any significant phase shift. Thus, the speed signal, illustrated at 326, is passed from rotor speed sensor 327 via a trigger circuit, illustrated at 328, where the square wave speed signal (pulse train) 326 is converted to a usable sinusoidal signal, illustrated at 330. The signal 330 is sent to a tracking notch filter 332, which may, for example, be an adaptive LMS (least mean square) filter. Outputted on line 334 is a synchronous signal which is proportional to and out of phase with the unbalance force the signal for which is received from the Hall-effect sensor 324 along line 336. These signals 334 and 336 are summed in the summer 338, and the difference (which is also fed back to the notch filter 332 via line 335), which is the synchronous component signal representing the dynamic unbalance force, is passed to amplifier 54 via line 340 where both mass unbalance and magnetic unbalance forces that influence the system response as well as vibrations transmitted to the surrounding structure are cancelled out from the signal sent to coil 62. Multiplying the filtered signal on line 340 by a gain and performing feed forward stator control on both x and y axes should accordingly allow any vibration problem caused by either mechanical or magnetic unbalance to be solved. Adaptive control procedures are commonly known to those of ordinary skill in the art to which this invention pertains and are discussed in greater detail in chapter 13 of K. Astrom et al, *Adaptive Control*, Addison-Wesley Pub. Co. of New York, 1989, pp 478 to 498, which is incorporated herein by reference.

It is also considered desirable to isolate the drive motor for the rotor from the sensor circuitry.

A suitable back-up bearing may be used with the stator controlled magnetic bearing of the present invention. If a powder lubricated back-up bearing is used, the desired lubricant is MoS2 (molybdenum disulfide), which is a conventional space and vacuum qualified solid lubricant.

Without wishing to be bound by theory, the following discussion provides a theoretical basis for the bearing according to the present invention. The two stator motion-control axes x and y are assumed to be independent of each other, and the following equations apply equally to each of the x and y axes. The equations of motion are as follows:

$$M_s X_s'' = K_m(X_s - X_b) - F_s$$

$$M_b X_b'' = K_m(X_b - X_b) - K X_b - C X_b' + F$$

where $M_s$=rotor mass at bearing
$M_b$=stator mass
$X_s$=rotor displacement
$X_b$=stator displacement
'=differentiate once with respect to time
''=differentiate twice with respect to time $K_m$=stiffness coefficient of magnetic field in air gaps
$K$=stiffness coefficient of stator mechanical support
$C$=damping coefficient of stator mechanical support
$F_s$=static load on rotor
$F$=stator control force.

The stator control force is represented as follows:

$$F = C_p X_s + C_d X_s' + C_i \int X_s dt$$

where $C_p$=proportional constant
$C_i$=integral constant
$C_d$=derivative constant
t=time.

A first priority of the bearing design is to make a stable control system by choosing a proper set of PID constants. For evaluating stability, the static force (static load on rotor) in the first equation above may be ignored. Taking Laplace transform of each of the above equations and combining the three transformed equations, the following normalized system characteristic equation is obtained:

$$MS^5 + CS^4 + (K-\mu-1)S^3 + (C_d-C)S^2 + (C_p-K)S + C_i = 0$$

where $\mu = M_b/M_s$.

All the parameters in this equation are normalized or dimensionless quantities as defined below, with the arrow sign meaning "imply":

$$S \rightarrow S/B_s \ (S=\text{Laplace variable}, B_s = \sqrt{K_m/M_s})$$

$$C \rightarrow C/\sqrt{K_m M_s}$$

$$C_d \rightarrow C_d/\sqrt{K_m M_s}$$

$$K \rightarrow K/K_m$$

$$C_p \rightarrow C_p/K_m$$

$$C_i \rightarrow C_i/K_m B_s$$

The above normalization is done with respect to the magnetic field stiffness (or negative spring rate) and the rotor mass, which are the basic given quantities of the bearing system. The artificial parameter Bs provides a calibration of the frequency location of the lowest system mode. The bearing design work is to choose a set of values for six parameters, i.e., $\mu, K, C, C_p, C_d$ and $C_i$, so that the above equation has stable roots which all lie in the left half of the S-plane.

For system sizing, out of the six parameters, only the mass ratio may be independently chosen, i.e., the stator mass relative to the rotor mass may be estimated. The remaining five normalized parameters can be determined by using the pole-placement method, i.e., if a system is considered to be state controllable, then poles of the closed-loop system may be placed at desired locations by means of state feed-back. A desirable set of five roots of the normalized equation may include a pair of reasonably damped complex conjugate roots and three negative real roots. For example, consider the following "desirable" five roots:

$$S = -0.3 \pm 0.5j; -0.6; -0.6; -1.0$$

The system characteristic equation is re-created as follows:

$$(S+0.3+0.5j)(S+0.3-0.5j)(S+0.6)^2(S+1.0)=0$$

or $$S^5+2.8S^4+3.22S^3+2.144S^2+0.8464S+0.1224=0$$

Comparing the latter equation to the normalized equation, the following is obtained:

$$C/\mu=2.8;\ (K-\mu-1)/\mu=3.22;\ (C_d-C)/\mu=2.144;$$

$$(C_p-K)/\mu=0.8464;\ C_i/\mu=0.1224$$

If the stator mass is chosen to be ⅛ of the rotor mass, then the five normalized system parameters are as follows:

$$C=0.35; K=1.5275;\ C_d=0.618; C_p=1.6333; C_i=0.0153$$

Figure 10B:
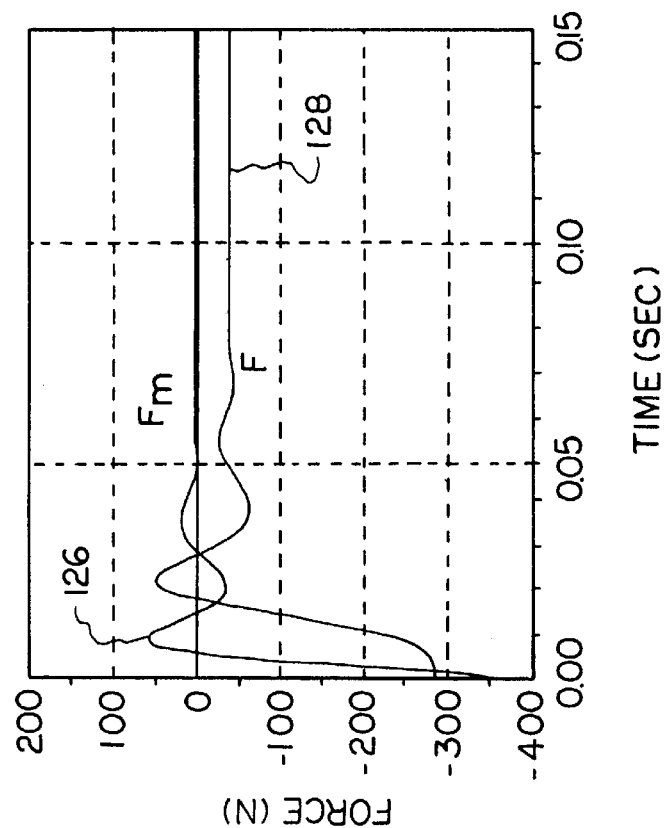
FIGS. 10a and 10b (collectively called FIG. 10) are graphs which illustrate changes in displacement from bearing center and force respectively during lift-off (start up), without integral control, of a magnetic bearing in accordance with FIG. 1.
Figure 10A:
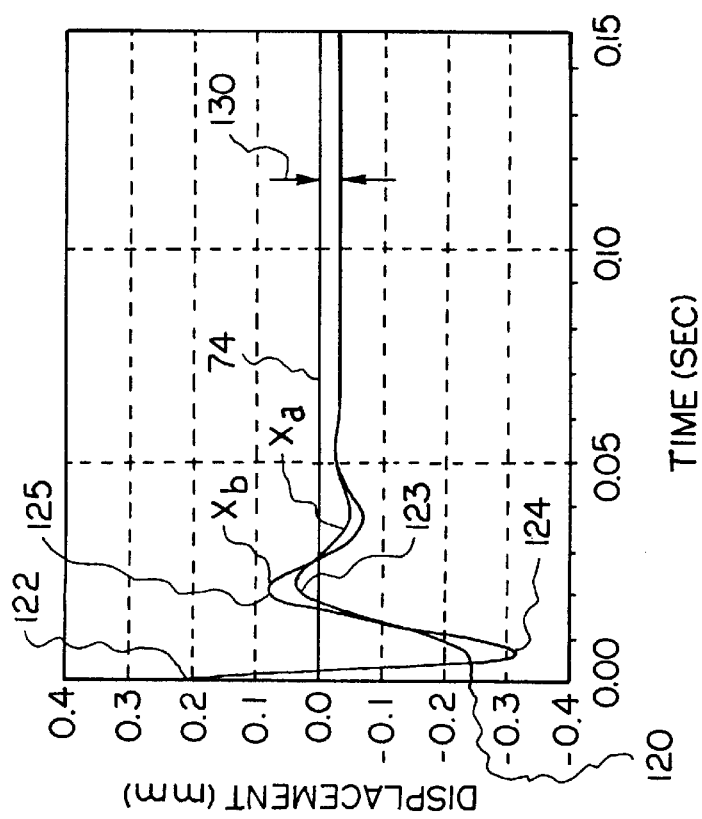
Figure 11B:
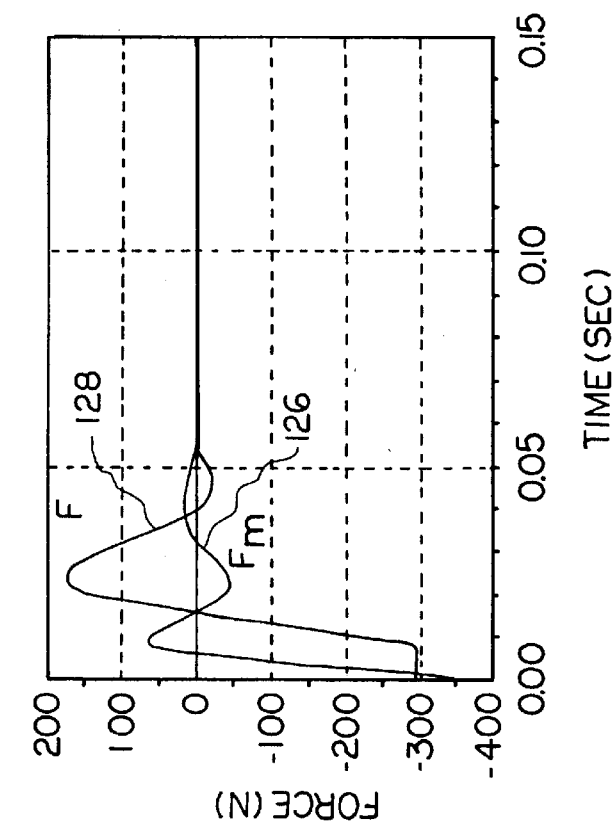
FIGS. 11a and 11b (collectively called FIG. 11) are graphs which illustrate changes in displacement from bearing center and force respectively during lift-off (start up), with integral control, of a magnetic bearing in accordance with FIG. 1.
Figure 11A:
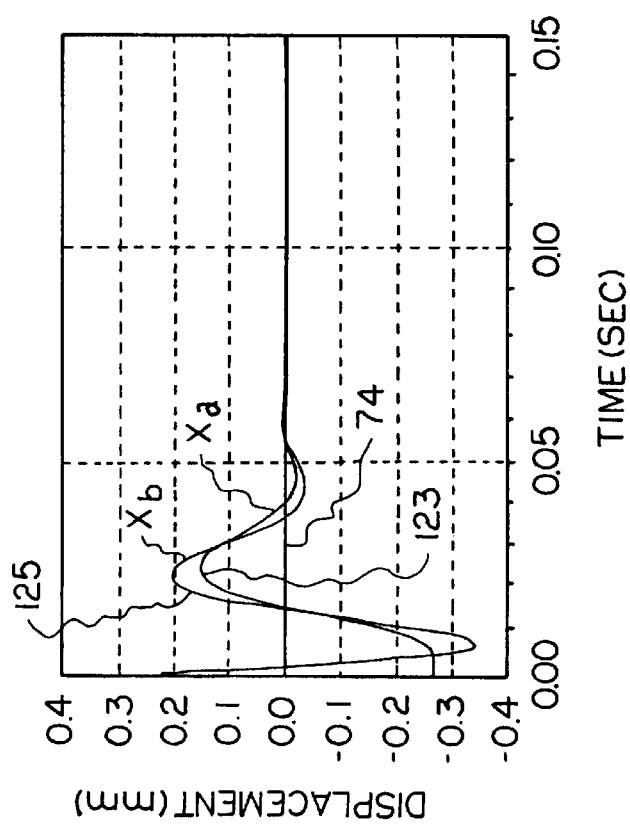
Figure 12B:
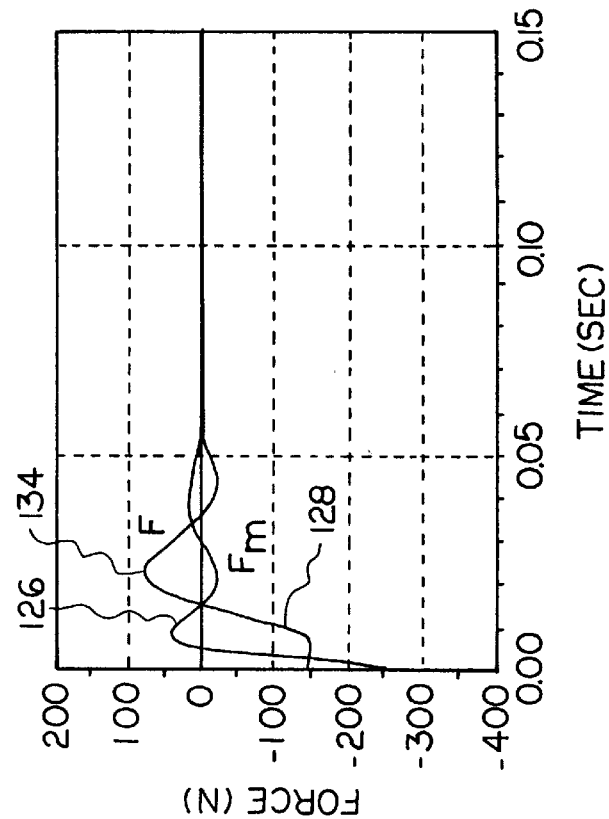
FIGS. 12a and 12b (collectively called FIG. 12) are graphs which illustrate changes in displacement from bearing center and force respectively during lift-off (start up), with integral control and with less shaft excursion than for the illustrations of FIGS. 10 and 11, of a magnetic bearing in accordance with FIG. 1.
Figure 12A:
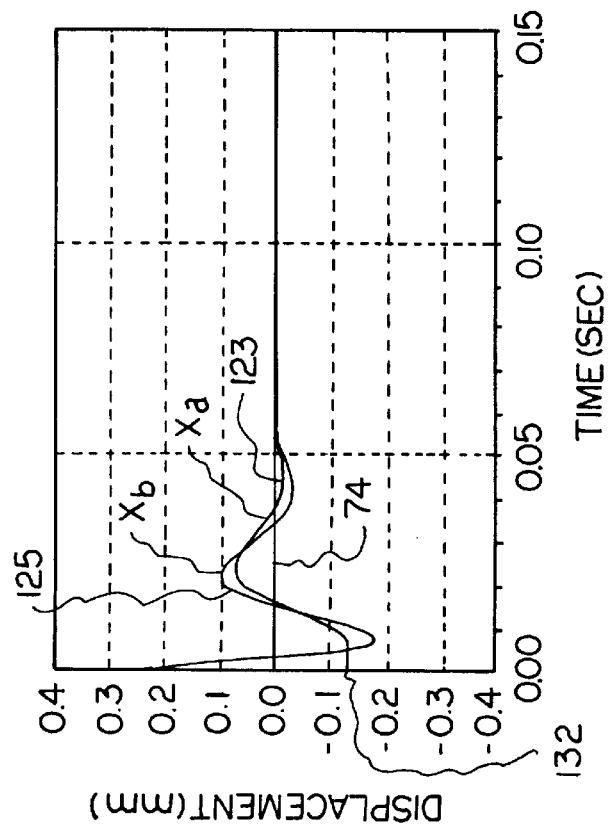

To test the performance of a bearing assembly 12 with the above parameters, a transient simulation of the rotor 10 lifting off the back-up bearing 70 was performed. The transient results showing rotor and stator displacements from bearing center 74 and the associated forces over the same time periods respectively in one of the two orthogonal axes x and y under three different conditions in three different tests are shown in the graphs of FIGS. 10 to 12 respectively. FIGS. 10a, 11a, and 12a illustrate at 123 and 125 the rotor and stator displacements respectively from the bearing center 74 with respect to time. FIGS. 10b, 11b, and 12b illustrate at 126 and 128 the force exerted on the rotor by the stator and static control force respectively with respect to the same time periods as for FIGS. 10a, 11a, and 12a respectively, The force exerted on the rotor by the stator is defined by $F_m=K_m(X_s-X_b)$. The system had parameters as chosen above and had a rotor mass of about 10 kg (22 lbs) and a negative stiffness of about −700,000 N/m (−4,000 lb/in) in the permanent magnet-created magnetic field. Before lift-off, the rotor leaned on the back-up bearing 70 at a distance of about 0.25 mm (0.010 inch) away from the center 74, as illustrated at 120, while the stator leaned on the opposite side stop 72 about the same distance away from the center 74, as illustrated at 122.

FIG. 10 shows the lift-off transient conditions without integral control. The stator moved over toward the shaft side, as illustrated at 124, to create lifting force, as illustrated at 126, when control began. FIG. 10 shows over-shooting rotor displacements which are the result of the chosen complex conjugate root pair being not well damped. As seen in FIG. 10, without integral control, a large static force can make the rotor so eccentric that the rotor may not be able to lift off the back-up bearing. The resulting large static displacement off-set, illustrated at 130, also requires a large static control force, illustrated at 128. The rotor eccentricity inside the stator is opposite to the static load direction, which is also the case in sensor-less magnetic bearings, as discussed in H. M. Chen, "Design and Analysis of a Sensorless magnetic Damper," presented at *ASME Turbo Expo*, Jun. 5–8, 1995, Houston, Tex., 95GT180.

FIG. 11 shows the lift-off transient conditions with integral control but under otherwise similar conditions as the test of FIG. 10. FIG. 11 shows that, with integral control, the steady-state shaft displacement and required control force 128 are desirably reduced to substantially zero.

FIG. 12 shows the lift-off transient conditions with less shaft excursion, obtained analytically via time transient numerical simulation but under otherwise similar conditions as the test of FIG. 11. FIG. 12a illustrates at 132 that the shaft back-up bearing clearance was reduced by about half, i.e., from about 0.25 mm in FIGS. 10a and 11a to about 0.125 mm in FIG. 12a. In addition, the maximum control force 128 was reduced by about half, as illustrated at 134.

When the stator is not under control (the stator actuator is not energized), the bearing 12 has a negative stiffness coefficient and no damping. When the stator is under control, the effective bearing dynamic stiffness is believed to be as follows:

$$K_{dyn}=K_m(X_b-X_s)/X_s=K_m[(C_p-K)+(C_d-C)S+C_i/S-M_bS^2]/[M_bS^2+CS+(K-K_m)]$$

Figure 13:
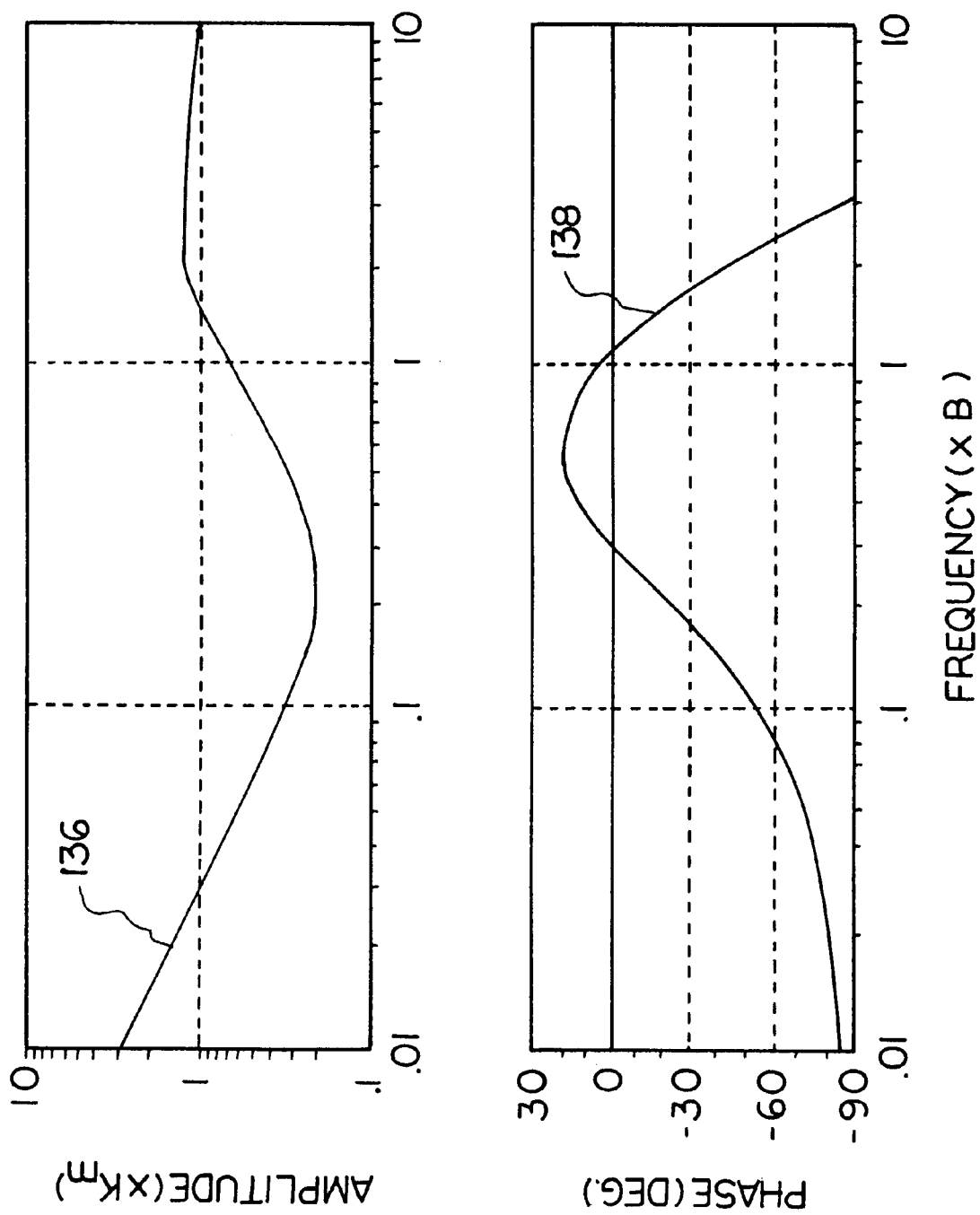
FIG. 13 is a graph of normalized dynamic stiffness (phase angle and amplitude at various frequencies) of a magnetic bearing in accordance with FIG. 1.

Apparently, the dynamic stiffness is a function of the stator mass as well as other parameters. For the above example, the normalized dynamic stiffness ($K_{dyn}/K_m$) is plotted in FIG. 13 wherein amplitude and phase angle are each plotted with respect to frequency, as illustrated at 136 and 138 respectively (showing the frequency dependent stiffness characteristic). The phase angle plot 138 shows that positive damping only occurs in a normalized frequency range between 0.3 and 1.2, which is at the system natural frequency. One may extend this range by choosing other sets of system roots to cover other system natural modes, if needed.

The size of the bearing is dictated by the magnetic stiffness. Thus, in bearing design, a value of magnetic stiffness is initially selected which relates to a given rotor mass. The magnetic stiffness is a function of the magnetic flux density, the nominal concentric air gap, and the circular pole area. It has a closed-form solution, as discussed in C. Knospe et al, "Side-pull and Stiffness of Magnetic Bearing Radial flux Return paths", *ASME, Journal of Tribology*, Vol. 118, January, 1996, pp 98–101, which may be simplified as follows:

$$K_m=(AB^2/2\mu_o)/g\ N/m$$

where $A=\pi DL$=circular pole area of one disk, m²
  D=rotor diameter, m
  L=axial thickness of one stator disk, m
  $\mu_o$=permeability of free space=$4\pi \times 10^{-7}$ Tesla/A-T Iterative calculations are involved in using this equation and choosing the proper values of rotor diameter, disc thickness, air gap, and achievable flux density. Once the flux density is determined, the sizes of the permanent magnet ring, i.e., its thickness and axial area, may be estimated with flux leakage factors considered, using procedures commonly known to those of ordinary skill in the art to which the present invention pertains.

The clearance between the rotor and back-up bearing is smaller than the magnetic air gap width 28, for example, it may be approximately half of the magnetic air gap width 28. For a given stator support stiffness, the required actuator force capacity is directly proportional to this clearance. Therefore, it is considered desirable in usual applications that this clearance be minimized. However, in applications where gimbaling is used and large shaft angular displacements are to be introduced through the stator actuator, the back-up bearing may preferably be one of a type wherein the gap varies such as, for example, the zero clearance bearing shown and described in U.S. Pat. No. 5,752,774 to Heshmat et al, which issued May 19, 1998, and which is assigned to the assignee of the present invention and which is incorporated herein by reference.

Figure 16:
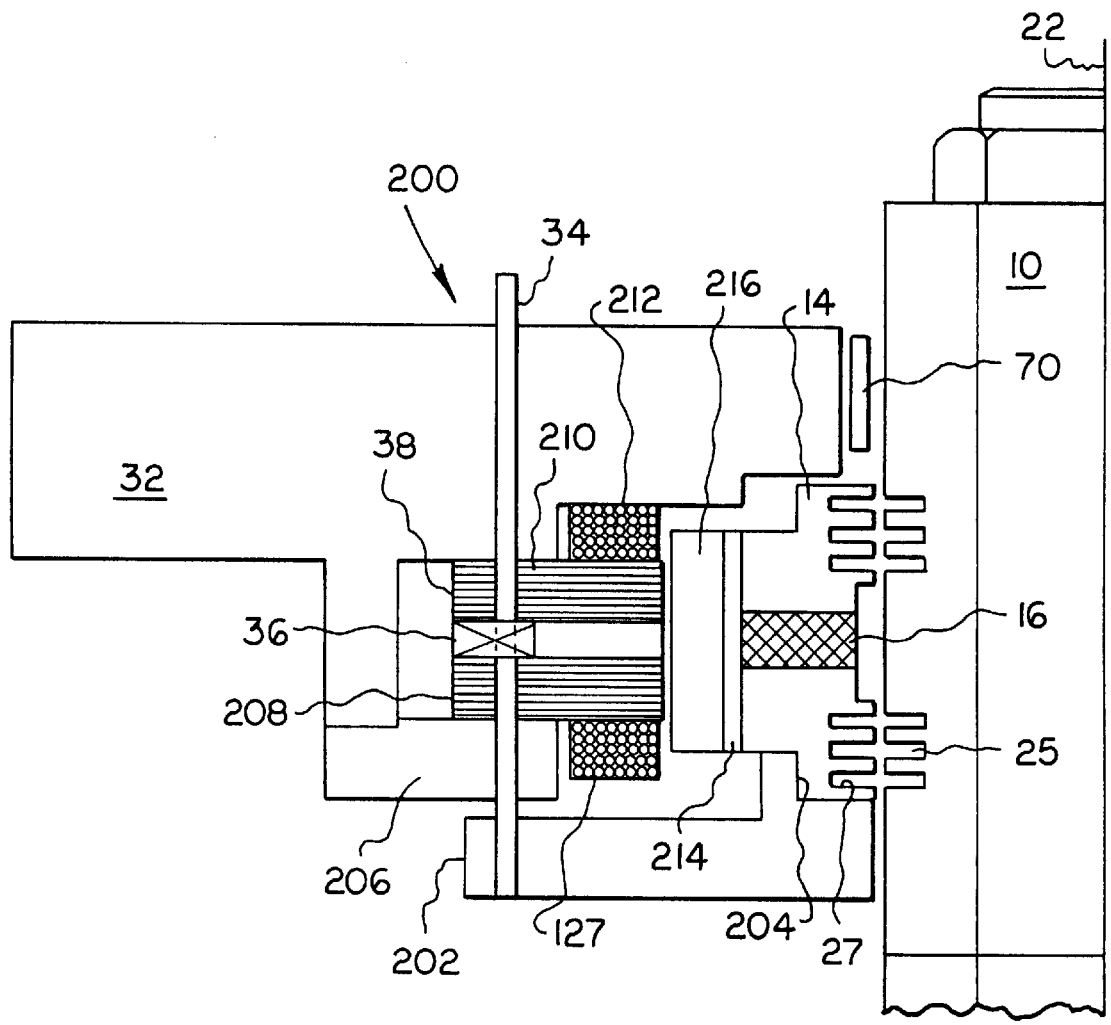
FIG. 16 is a half longitudinal sectional view, partly schematic, with the other half being the same as that shown, of another embodiment of the bearing.
Figure 17:
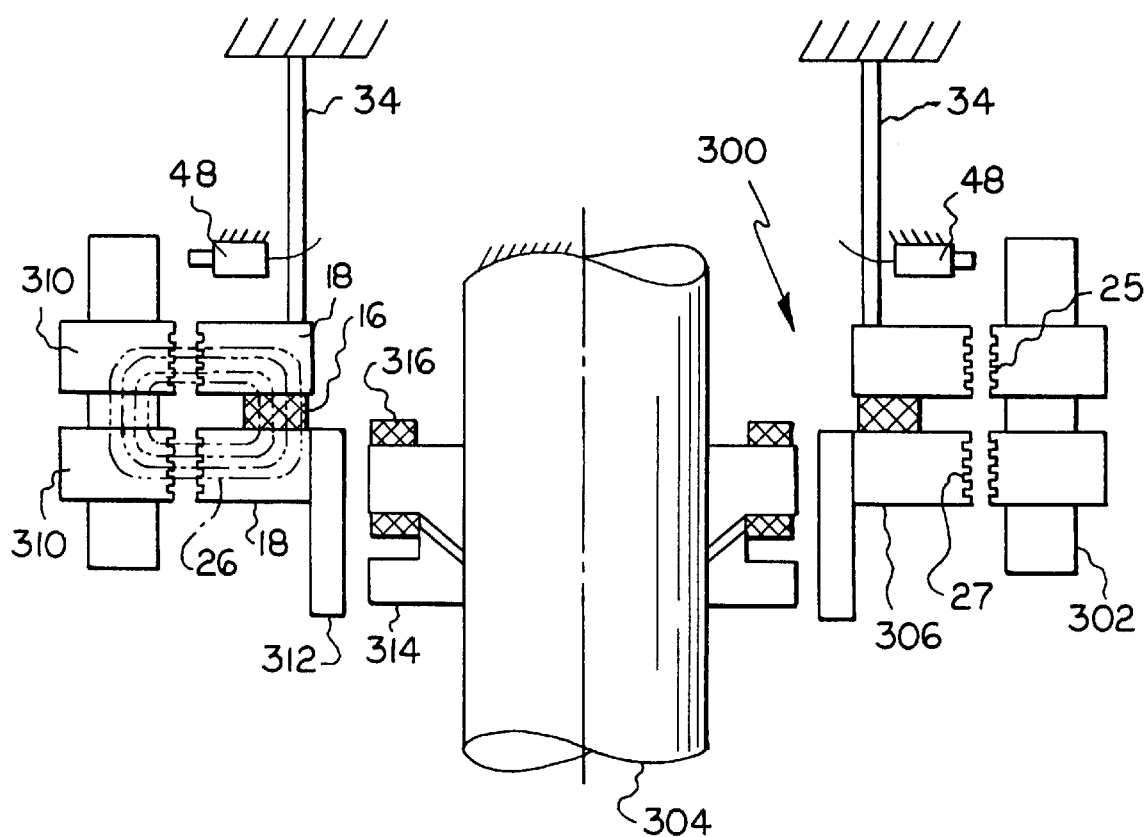
FIG. 17 is a longitudinal sectional view, partly schematic, of another embodiment of the bearing.

Referring to FIG. 16, there is shown at 200 a magnetic bearing in accordance with an alternative embodiment of the present invention wherein the bearing is constructed to be compact in the axial direction. The bearing contains a stator 14 held and positioned or located by a plate 202 having a counterbore 204 and prevented from skewing by spring mounting rods 34. The stator includes a permanent axially polarized magnet ring 16 sandwiched between two discs (not shown) which are similar and similarly positioned as discs 18 (FIG. 1) of ferromagnetic material, and the adjacent portion of the rotor is composed of ferromagnetic material to provide lines of magnetic flux between the discs 18 and the rotor ferromagnetic material.

An x direction actuator 38 is suitably received within housing 32 and held in position by plate 206 suitably attached to housing 32. A similar y direction actuator (not shown) is spaced 90 degrees therefrom. Similar to the bearing of FIGS. 1 and 2, the actuator 38 includes a pair of diametrically opposed bias flux permanent magnets and an electromagnet 208 comprised of ferromagnetic laminations 210 and electrical windings 212 for providing control current as is well understood by those of ordinary skill in the art to which this invention pertains.

As seen in FIG. 16, the magnetic actuator 38 is radially adjacent and axially aligned with the stator magnet ring 16 to therefore provide compactness in the axial direction, such compactness axially being especially important for flywheel applications. However, analytical modeling of the field provided by the magnetic actuator 38 and the field provided by the stator magnet 16 has indicated that the two fields can interact to cause either saturation or cancellation of the flux fields in the overlap region. This interaction of the flux fields is considered to be detrimental to bearing performance and controllability, i.e., there may be an inability to make the controller stable with this interaction due to an unknown and nonlinear variation in the magnetic control and stator forces. In order to prevent magnetic field interference between these two fields, in accordance with the present invention, a non-magnetic insulating spacer ring 214 is disposed between the portions of the actuator 38 and the magnet ring 16 where the magnetic fields are created. The insulating ring 214, which may be composed, for example, of aluminum or a non-magnetic stainless steel, extends over substantially the thickness (axial direction) of the stator 14 and is shown to be sandwiched between the portion of the stator 14 containing the magnet 16 and a radially outer ring portion 216 of the stator 14, which contains magnetic material for the stator actuator magnet to act on.

Referring to FIG. .17, there is shown generally at 300 a stator controlled magnetic radial bearing for a mass-loaded flywheel rotor 302 rotating about a non-rotating center support post 304. Illustrated at 306 is a stator therefore flexibly mounted by means of spring rods 308 or other suitable means to allow movement of the stator radially but without skewing as previously described. The stator 306 includes a permanent magnet ring 16 sandwiched axially between discs 18 of ferromagnetic material, and the adjacent portion of the rotor contains ferromagnetic material including discs 310 to thereby allow lines of flux 26 for effecting radial movement of the rotor by the stator 306 similarly as previously discussed. Stator ring portion 312 also contains ferromagnetic material. A sleeve 314 on the center post 304 contains electromagnetic means, illustrated at 316, for magnetically interacting with the stator ring portion 312 for effecting radial movement thereof in response to signals of rotor position as provided by position sensors 48 to control rotor position similarly as previously discussed.

Figure 14:
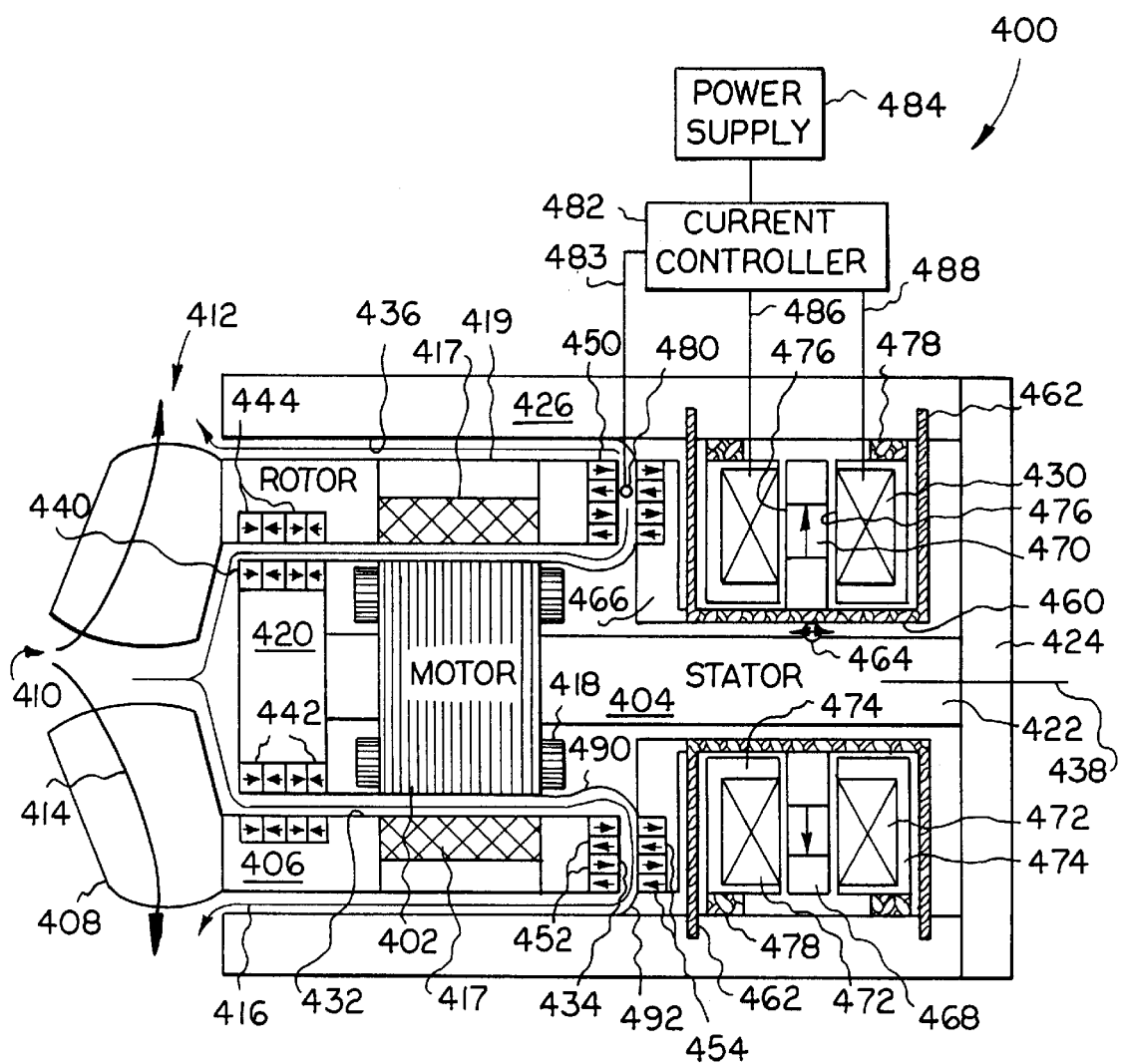
FIG. 14 is schematic view taken in an axial plane of a pump which has a thrust bearing in accordance with another embodiment of the present invention.

Referring to FIG. 14, there is illustrated generally at 400 a pump in accordance with an alternative embodiment of the present invention wherein a stator-controlled magnetic bearing is provided as a thrust bearing. As also described in U.S. patent application Ser. No. 09/046,334, filed Mar. 23, 1998, which is assigned to the assignee of the present invention and the disclosure of which is incorporated herein by reference, the pump 400 comprises a motor 402 including a stator 404 received within a rotor 406 to which an impeller 408 is suitably attached to one end. The assembly is suitably sea y contained within a housing comprising members 424 and 426. The impeller 408 receives fluid from an inlet, illustrated at 410, and forces it, as illustrated at 414, through an outlet, illustrated at 412, in accordance with principles commonly known in the art. The fluid also flows, as illustrated at 416, through passages between the rotor 406 and stator 404 and between the rotor 406 and housing member 426 then out through the outlet 412. As seen in FIG. 14, the flow path 416 around the rotor 406 is desirably less torturous.

The motor 402 includes circumferentially spaced permanent magnets 417 and a surrounding ring 419 of ferromagnetic material on the rotor 406 and electromagnetic coils 418 on the stator 404 which magnetically interact with the magnets 417 to effect rotation of the rotor 406, as is commonly known in the art. In order that the overall size of the pump 400 may be reduced even further, the motor 402 may preferably be of the iron-less type so that the negative spring effect (side pull) can be reduced whereby the radial bearings (described hereinafter) may be less stiff and smaller.

The stator 404 has an axial extension 420 on the impeller side. To the other side, the stator 404 has a reduced diameter elongate extension 422 to the end of which is attached the enlarged diameter cylindrical housing portion 424 which extends radially beyond the rotor 406. Housing portion 426, which is sleeve-shaped, extends from the radially outer edge of portion 424 axially back toward the impeller 408 so that the rotor 406 is rotatably positioned between the housing portion 426 radially outwardly thereof and the extension 420 and stator portion containing the coils 418 radially inwardly thereof. Interposed between the axially inner end of the rotor 406 and the cylindrical portion 424 is a thrust bearing assembly 430 in accordance with the present invention, which assembly will be described in greater detail hereinafter. The flow path 416 includes an axially extending fluid gap 432 between the rotor 406 and the stator extension 420 and continuing to extend axially inwardly to the thrust bearing assembly 430, a radially extending fluid gap 434 between the rotor 406 and the thrust bearing assembly 430, and an axially extending fluid gap 436 between the rotor 406 and the sleeve member 426. Preferably, each of the axial gaps 432 and 436 extends in a direction substantially parallel to the rotational axis, illustrated at 438, of the pump 400, and the radial gap 434 extends in a direction substantially normal to the axis 438.

A radial or journal bearing 440 is provided along the axial gap 432 and includes a plurality of, for example, four axially stacked and axially polarized permanent magnet rings 442 on the rotor extension 420 which are oriented across the gap from similar magnet rings 444 on the stator 406 to magnetically interact therewith.

At the opposite end of the rotor 406, the rotor 406 is magnetically supported by a radial or journal bearing 450 which is provided along the radial gap 434 and includes a plurality of, for example, four radially stacked and axially polarized permanent magnet rings 452 on the rotor end which are oriented across the gap from similar magnet rings 454 to magnetically interact therewith. In addition to acting to support the rotor 406, the bearing 450 is also part of the thrust bearing assembly 430, as hereinafter discussed.

The stator portion 422 is received within a cylinder 460 of, for example, stainless steel which is suitably connected to the stator portion 426 by a pair of discs 462 of flexible material such as, for example, thin stainless steel attached at the ends respectively of cylinder 460 and to the portion 426, allowing axial movement of cylinder 460, as illustrated at 464. A disc 466, having a central opening, illustrated at 468, in which the stator portion 422 is received, is suitably attached to the cylinder 460 so that the disc 466 moves axially as the cylinder moves. The magnet rings 454 are suitably mounted on the disc 466 so that magnet rings 454 are movable axially toward and away from magnet rings 452.

A disc 468 is suitably mounted axially centrally on the cylinder 460 and extends radially outwardly therefrom. A radially polarized permanent magnet ring 470 is suitably mounted on the disc 468, generally radially centrally thereof. A pair of electromagnetic coil assemblies 472 are mounted in ferromagnetic material in the form of rings 474 respectively to position the electromagnetic coil assemblies 472 in interactive relationship with the permanent magnet ring 470 with air gaps, illustrated at 476, separating the electromagnetic coil assemblies 472 from the permanent magnet ring 470 respectively. The ferromagnetic rings 474 are attached to the stator portion 426 by suitable mounts, illustrated at 478. Thus, by varying the current supplied to the electromagnetic coil assemblies 472 and the resulting interaction with the permanent magnet ring 470, the disc 468 is movable axially thereby effecting axial movement of the cylinder 460 and the disc 466 on which the permanent magnet rings 454 are mounted. Accordingly, by varying the current to the electromagnet coil assemblies 472, the permanent magnet rings 454 may be moved axially toward and away from the permanent magnet rings 452.

The axial position of the rotor 406 is monitored by a probe, illustrated schematically at 480, which may, for example, be a Hall-effect device. Signals from the probe 480 are continually sent to a current controller circuit 482 via line 483, powered by a suitable power supply 484, which outputs current via lines 486 and 488 to the electromagnetic coil assemblies 472 respectively based on the signals of rotor position to effect movement of the rotor to the predetermined position, using principles commonly known to those of ordinary skill in the art to which this invention pertains. There is an attractive force between each pair of corresponding permanent magnet rings 452 and 454 across the gap 434. When the magnet rings 454 are moved in a direction axially away from magnet rings 452, the lessened or weakened flux or attraction there between will result in a lessened tendency of the rotor to also move in that direction. Thus, as viewed in FIG. 14, when the magnet rings 454 are moved to the right, the magnet rings 452 will be more free to move to the left. Conversely, when the magnet rings 454 are moved to the left, the magnet rings 452 will be urged more to move to the right.

The magnet rings 444 are mounted in a repulsive relation to the corresponding magnet rings 442. When a corresponding pair of magnet rings 442 and 444 are aligned, they are still unstable since an axial force on the rotor will cause the magnet ring 442 to move axially away from the corresponding magnet ring 444. In accordance with the present invention, the magnet rings 442 and 444 are mounted so that the magnet rings 444 on the rotor are shifted a little to the left (away from the radial bearing 450) to a predetermined position relative to the corresponding magnet rings 442 on the stator so that there will be continuously a greater or lesser amount of force acting to pull the rotor to the left (away from the radial bearing 450). The width of gap 434 or the distance between magnet rings 452 and 454 is initially selected to apply an equal force to the right to balance this force acting to pull the rotor to the left. If the rotor is pulled further to the left (past the predetermined position), this will be sensed by probe 480 which will so signal the current controller which will in turn vary the current to the electromagnetic coil assemblies 472 to interact magnetically with the permanent magnet 468 to effect movement of the magnet rings 454 to the left (toward magnet rings 452) thus increasing the attractive force there between to effect movement of the rotor back to the right to the predetermined position. If the rotor, when pulled to the right is pulled past the predetermined position, this will also be sensed by probe 480 which will so signal the current controller which will in turn vary the current to the electromagnetic coil assemblies 472 to interact magnetically with the permanent magnet 468 to effect movement of the magnet rings 454 to the right (away from magnet rings 452) thus decreasing the attractive force there between to allow movement of the rotor back to the left to the predetermined position. Thus, the rotor position is continuously monitored and the current to the electromagnetic coil assemblies 472 continuously varied as necessary to continually effect movement of the rotor to the predetermined axial position.

In order to contain the flow of fluid within the gaps 432, 434, and 436 so that it does not flow out into other spaces where it might stagnate, a suitable fluid impermeable flexible sheet 490 is suitably attached to suitably extend between disc 466 and the stator portion containing the motor stator coils 418, and another suitable fluid impermeable flexible sheet 492 is suitably attached to suitably extend between disc 466 and the stator portion 426.

Thus, there is provided in accordance with the present invention a stator-controlled magnetic bearing wherein the stator is moved in response to feed-back of rotor position to effect movement of the rotor toward a predetermined position. The bearing may be a journal bearing which has a laterally-movable stator without protruding poles to face the rotor. The stator utilizes a permanent magnet ring so that the annular distribution of radial magnetic flux in the air gaps may be uniform circumferentially whereby there are little or no eddy current or magnetic hysteresis losses. Since the magnetic bearing is actively controlled, its stiffness and damping properties may be electronically manipulated thus making it ideal for supporting high speed rotors such as those of momentum and energy storage flywheels. The bearing may alternatively be a thrust bearing.

It should be understood that, while the invention has been described in detail herein, the invention can be embodied otherwise without departing from the principles thereof, and such other embodiments are meant to come within the scope of the present invention as claimed by the appended claims.

What is claimed is:

1. A bearing for a rotor comprising a stator, means for magnetically interacting said stator with the rotor, and means responsive to feed-back of a rotor position for moving said stator relative to the rotor position to thereby use changes in forces of the magnetic interaction between said stator and the rotor resulting from movements of the stator relative to the rotor position to effect movement of the rotor toward a predetermined rotor position for bearingly controlling position of the rotor.

2. A bearing according to claim 1 wherein said magnetically interacting means comprises a magnet in a shape of a ring disposed on one of said rotor and said stator and extending circumferentially of said rotor.

3. A bearing according to claim 1 further comprising means for inputting to said stator moving means measurements of difference in flux density at diametrically opposed sides of the rotor.

4. A bearing according to claim 1 further comprising means for electronically dampening vibrations of said stator.

5. A bearing according to claim 1 wherein said stator moving means comprises means for applying magnetic fields to said stator for moving thereof, the bearing further comprising means for isolating the magnetic fields of said stator moving means from magnetic fields of said means for magnetically interacting said stator with the rotor.

6. A bearing according to claim 1 wherein the bearing is a journal bearing, the bearing further comprising means defining circumferentially extending grooves in the rotor and said stator which are axially alignable in response to changes in reluctance at the grooves for bearingly maintaining axial position of the rotor.

7. A bearing according to claim 1 wherein the rotor is tubular, and said stator is received within the rotor.

8. A bearing according to claim 1 further comprising means for inputting to said stator moving means signals representing dynamic unbalance forces on the rotor for outputting signals for movement of the stator which cancel the dynamic unbalance forces on the rotor for balancing thereof.

9. A bearing according to claim 1 wherein said magnetically interacting means comprises a magnet and means for disposing said magnet in position for effecting magnetic interaction between said stator and the rotor without being attached to either the rotor or said stator.

10. A bearing according to claim 9 wherein said magnet is an electromagnet.

11. A bearing according to claim 9 wherein said magnet is in a shape of a ring and extends circumferentially of said rotor.

12. A bearing according to claim 1 wherein the bearing is a journal bearing.

13. A bearing according to claim 1 wherein the bearing is a thrust bearing.

14. A bearing according to claim 1 wherein the bearing has a gap width which is at least about 0.03 inch.

15. A bearing according to claim 1 further comprising means for dampening stator vibrations.

16. A bearing for a rotor comprising a stator which circumscribes the rotor, means for magnetically interacting said stator with the rotor, and means responsive to feed-back of a rotor radial position for moving said stator radially relative to the rotor radial position to thereby use chances in forces of the magnetic interaction between said stator and the rotor resulting from movements radially of the stator relative to the rotor radial position to effect movement of the rotor radially toward a predetermined rotor radial position.

17. A method for bearingly controlling position of a rotor comprising magnetically interacting a stator with the rotor and moving the stator relative to a rotor position in response to feed-back of the rotor position to thereby use changes in forces of the magnetic interaction between the stator and the rotor resulting from movements of the stator relative to the rotor position to effect movement of the rotor toward a predetermined rotor position.

18. A method according to claim 17 wherein the step of moving the stator comprises moving the stator radially in response to feed-back of the rotor radial position to effect movement of the rotor toward a predetermined rotor radial position.

19. A method according to claim 17 wherein the step of moving the stator comprises moving the stator axially in response to feed-back of the rotor axial position to effect movement of the rotor toward a predetermined rotor axial position.

20. A method according to claim 17 further comprising electronically dampening stator vibrations.

* * * * *